US00H002114H

(19) United States

(12) Statutory Invention Registration

Novak et al.

(10) Reg. No.: US H2114 H

(43) Published: Feb. 1, 2005

(54) INSPECTION TOOL FOR TESTING AND ADJUSTING A PROJECTION UNIT OF A LITHOGRAPHY SYSTEM

(75) Inventors: W. Thomas Novak, Hillsborough, CA (US); John H. McCoy, El Dorado, CA (US); Martin E. Lee, Santa Clara County, CA (US)

(73) Assignee: Nikon Corporation, Tokyo (JP)

(21) Appl. No.: 10/298,286

(22) Filed: Nov. 14, 2002

(51) Int. Cl.[7] ..... G01B 9/00

(52) U.S. Cl. ..... 356/124

(58) Field of Search ..... 356/124

*Primary Examiner*—Daniel T. Pihulic

(74) *Attorney, Agent, or Firm*—Beyer Weaver & Thomas, LLP

(57) ABSTRACT

An inspection system and method are disclosed. The inspection system is configured to inspect a projection unit having multiple optical subsystems. The optical subsystems are configured to project an image during a lithography step. The inspection system provides self calibration by measuring both a test mask and the aerial image of the test mask with the same detector assembly. The inspection system is also capable of measuring multiple fields simultaneously using multiple detectors and 6 axis interferometry to accurately determine the position of each detector. Additionally, the inspection system is capable of measuring the distance between the test mask and the detector assembly with an indirect path around the projection unit which normally blocks the direct path.

49 Claims, 14 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

INSPECTION TOOL FOR TESTING AND ADJUSTING A PROJECTION UNIT OF A LITHOGRAPHY SYSTEM

BACKGROUND OF THE INVENTION

The present invention relates generally to a lithography system. More particularly, the present invention relates to improved techniques for inspecting optical projection units, which are used in lithography systems.

Lithography systems used in the manufacture of integrated circuits and flat panel displays have been around for some time. Such systems have proven extremely effective in the precise manufacturing and formation of very small details in the product. In most lithography systems, a circuit image is written on a substrate by transferring a pattern via a beam (e.g., light beam). As is generally well known, lithography systems typically include an illumination unit for transmitting the beam through patterns resident on the surface of a mask and a projection unit for projecting the transmitted beam onto the surface of the substrate.

The projection unit generally contains an optical subsystem having a plurality of optical components that work together to collect and project the transmitted beam. By way of example, the optical subsystem may include optical components such as lenses, prisms, mirrors and the like. Unfortunately, the optical components, either separately or together, may contain imperfections that cause differences between the pattern on the mask and the projected image of the pattern, i.e., the projected image may not coincide exactly with the pattern on the mask. By way of example, the imperfections may be related to mis-aligned optical components or optical components with defects or variations. As should be appreciated, any differences created between the pattern on the mask and the projected image of the pattern make it difficult to ensure precise manufacturing of the product, i.e., the image differs from what is sought and therefore the printed pattern on the substrate is adversely effected. By way of example, the width of printed lines may be increased or decreased, the position of the lines may be skewed or shifted, subsequently processed patterns in the product may be misaligned and the like.

In general, the optical subsystems are certified in the factory before final shipment to the customer. The certification process generally includes testing and adjusting the optical subsystems until they meet desired specifications. Unfortunately, however, due to the inherent high-precision nature of the optical components, testing and adjustments thereto can be difficult to achieve in a cost effective, accurate and speedy manner.

Conventionally, the projection unit has been installed in the lithography system in order to perform testing on the optical subsystems. In most cases, the optical subsystems are tested by exposing photoresist with a projected image of a test mask and then examining the resultant printed image of the projected image in the photoresist. Unfortunately, photoresist exposure and subsequent measurement is typically very slow, and limited in the type of measurements that may be performed, as well as in the accuracy of the measurements. For example, the determination of focus and therefore the focal plane is typically not very accurate in photoresist. Furthermore, there is generally not enough space to perform the adjustments on the optical subsystems when the projection unit is disposed in the lithography system and therefore the projection unit is typically removed from the lithography system when adjustments on the optical subsystems are needed. In most cases, several iterations of testing and adjustments are needed to meet specifications and thus the process of installing and removing is unfortunately slow and time consuming. Moreover, multiple installations and removals may lead to other imperfections of the optical subsystem, i.e., misalignments may be produced when the projection unit is installed or removed.

Thus, there is a need for improved techniques for testing and adjusting the optical subsystem of a projection unit.

SUMMARY OF THE INVENTION

The invention relates, in one embodiment, to an inspection system for performing optical tests associated with determining the imaging quality of a plurality of optical subsystems of an optical system. The optical tests are performed with a test mask having a plurality of measurable test patterns formed thereon. The inspection system includes a detector assembly capable of measuring the measurable test patterns of the test mask and the aerial image of the measurable test patterns as projected through the optical subsystems so as to determine the optical characteristics of each of the optical subsystems.

The invention relates, in another embodiment, to a detector assembly for use in a tool for inspecting optical systems having a plurality of optical subsystems. The detector assembly includes a plurality of detector mechanisms. Each of the detector mechanisms corresponds to individual ones of the optical subsystems. The detector mechanisms are configured to simultaneously measure the optical characteristics of each of the optical subsystems.

The invention relates, in another embodiment, to a position location assembly for use in a tool for inspecting optical systems having a plurality of optical subsystems. The assembly includes a detection system configured to continuously determine the position of a detector assembly relative to one or more reference points. The detection system includes one or more first sensors that measure the distance between a fixed reference frame and the detector assembly, and one or more second sensors that measure the distance between a test mask and the detector assembly.

The invention relates, in another embodiment, to an inspection system. The inspection system includes a test component configured to help determine the optical characteristics of an optical component. The inspection system also includes an optical detection component configured to perform optical tests on an optical component. The detector component cooperates with the test component to determine the optical characteristics of the optical component. The optical component is disposed between the test component and the detector component while the tests are being performed. The inspection system additionally includes a position detection component configured to measure the distance between the test component and the detector component with an indirect path around the optical component which blocks the direct path.

The invention relates, in another embodiment, to a method of self calibrating an inspection system. The inspection system is configured to inspect an optical component of a lithography system. The method includes providing a test mask having on or more test patterns. The method also includes measuring the test patterns with the inspection system. The method additionally includes measuring the images of the test patterns with the same inspection system. The images are formed by the optical component. The method further includes comparing the test patterns with the images.

The invention relates, in another embodiment, to a method of inspecting optical projection units having multiple fields. The method includes simulataneously measuring multiple fields with multiple detectors. Each of the detectors corresponds to an individual field. The method also includes moving the multiple detectors to various measurement points within its corresponding individual field. The method additionally includes determining the position of each detector with 6 axis interferometry.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

The invention generally pertains to an inspection system and method for inspecting projection units, which are used in lithography systems. One aspect of the invention relates to an offline inspection tool for testing and adjusting the optical subsystems of projection units. Another aspect of the invention relates to testing multiple optical subsystems of the projection unit with a detector arrangement. Another aspect of the invention relates to comparing a measured pattern of a test mask with a measured image of the pattern projected by the optical subsystem under test. Yet another embodiment of the invention relates to monitoring the position of the detector arrangement to ensure precise and accurate measurements of the pattern and projected image.

These and other aspects of the invention are discussed below with reference to FIGS. 1–16. However, those skilled in the art will readily appreciate that the detailed description given herein with respect to these figures is for explanatory purposes as the invention extends beyond these limited embodiments.

Figure 1:
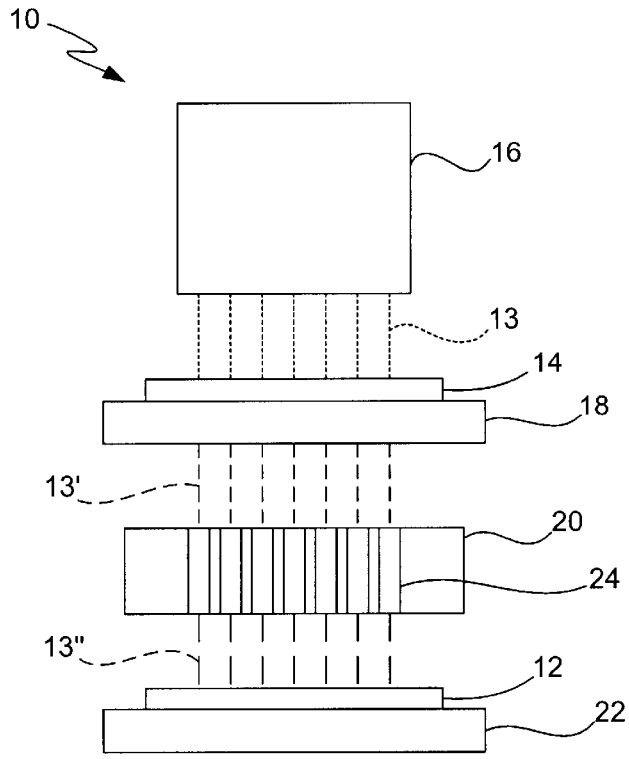
FIG. 1 is a simplified diagram of a lithography system 10, in accordance with one embodiment of the present invention.

FIG. 1 is a simplified diagram of a lithography system 10, in accordance with one embodiment of the present invention. By way of example, the lithography system may be used to fabricate integrated circuits (IC), flat panel displays, and the like. The lithography system 10 is generally arranged for writing an image on the surface of a substrate 12 by transmitting one or more light beams 13 through a patterned mask 14. The light beams may be widely varied. For example, the light beams may be configured to illuminate an area such as a trapezoidal area.

As shown in FIG. 1, the lithography system 10 generally includes an illumination unit 16, a mask stage 18, a projection unit 20 and a substrate stage 22. The illumination unit 16 is configured to generate and direct the light beam(s) 13 to the surface of the mask 14. Although not shown, the illumination unit 16 generally includes a light source for generating the light beam(s) and associated optics for directing the light beam(s) to the mask 14. The projection unit 20, on the other hand, is configured to collect the transmitted light 13' that is passed through the mask 14, and to direct (e.g., focus) the collected light 13" to the surface of the substrate 12. As shown, the projection unit 20 includes one or more optical subsystems 24, each of which contains a variety of optical components such as lenses, prisms, mirrors, and the like. In one embodiment, the optical subsystems may contain 14 to 18 separate lenses for directing the light therethrough. The projection unit 20, and more particularly the optical subsystems 24, may be arranged to increase, reduce or maintain the size of the images produced by the patterned mask 14. In the illustrated embodiment, the projection unit 20 is arranged to maintain the size of the images produced by the mask 14 so as to form an image of similar size on the surface of the substrate 12 (1:1 ratio).

The illumination unit 16 and projection unit 20 set-up may be widely varied. For example, the units 16, 20 may be configured to process a single beam or multiple beams. In the illustrated embodiment, the illumination unit 16 is configured to produce a light field distribution containing a plurality of light beams 13. By way of example, the illumination unit may include a plurality of light sources, each of which produces a separate beam or it may include a single light source with a beam splitter that splits the generated beam into a plurality of beams. In addition, the projection unit 20 is configured to individually collect and direct each of the light beams 13' in the light field distribution to the surface of the substrate 12 via a plurality of optical subsystems 24. In most cases, the number of optical subsystems 24 corresponds to the number of light beams 13 produced by the illumination unit 16, i.e., there is a distinct optical subsystem for each beam. In the illustrated embodiment, the illumination unit 16 is configured to direct seven light beams 13 to the surface of the mask 14 and therefore the projection unit 20 includes a seven corresponding optical subsystems 24.

As shown in FIG. 1, the mask stage 18 is positioned between the illumination unit 16 and the projection unit 20 and the substrate stage 22 is positioned below the projection unit 20. The mask stage 18 is generally arranged to hold and move the patterned mask 14 while the substrate stage 22 is generally arranged to hold and move the substrate 12. The movement of the stages may be widely varied. In the illustrated embodiment, the stages 18, 22 are moved together along a linear scan path so that all or any selected part of the patterned mask 14 is scanned. Although only a small portion of the mask 14 is imaged at any one time, the surface of the mask 14 is sequentially exposed to the fields of the light beams 13, thereby allowing a pattern (similar to the pattern on the mask) to be built up on the substrate 12. Alternatively, a serpentine path, which moves back and forth in the direction of the X-axis while being incremented in the Y-direction at the end of each traverse, may be used.

Figure 2:
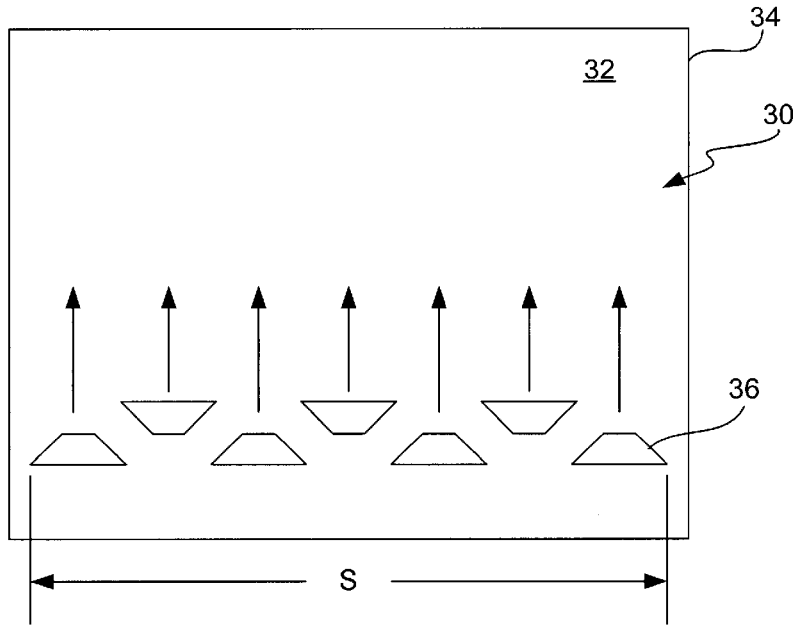
FIG. 2 is a top view of a light field distribution 30 produced by an illumination unit, in accordance with one embodiment of the present invention.
Figure 3A:
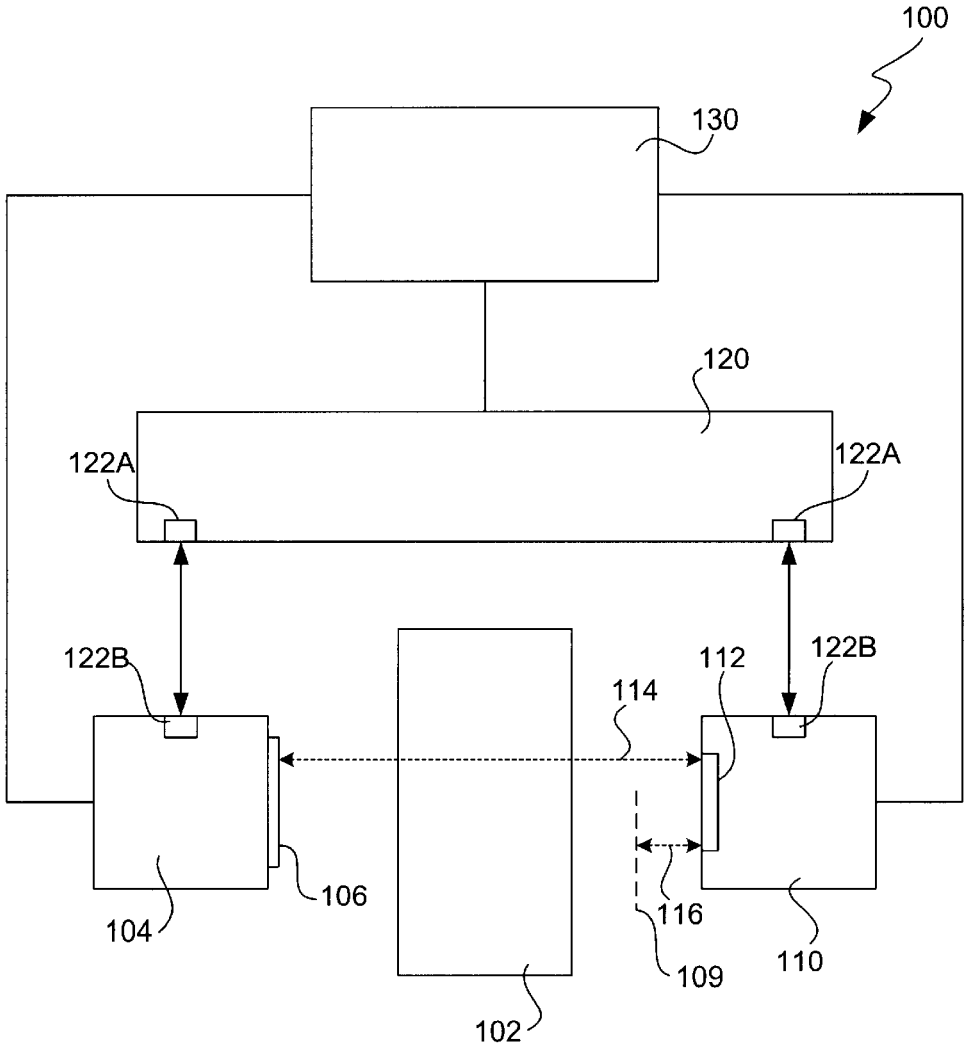
FIG. 3A is a simplified block diagram of an inspection system 100 for inspecting a projection unit 102, in accordance with one embodiment of the present invention.
Figure 3B:
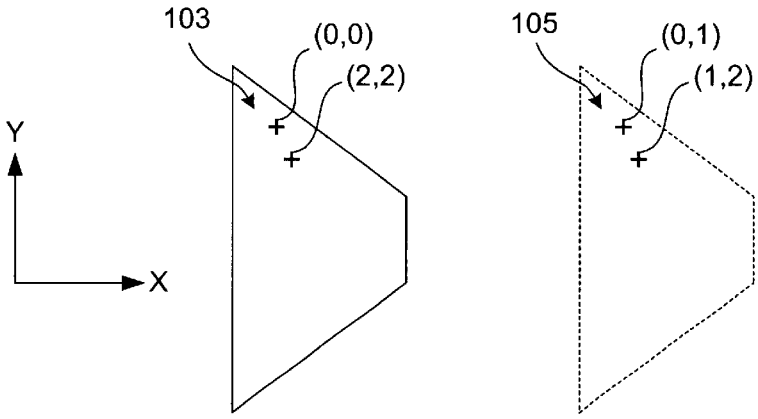
FIG. 3B is a simplified diagram of test patterns showing deviations between a first test data and a second test data, in accordance with one embodiment of the present invention.

FIG. 2 is a top view of a light field distribution 30 produced by an illumination unit, in accordance with one embodiment of the present invention. In this Figure, the light field distribution 30 is shown incident on a surface 32 of a mask 34. By way of example, the light field distribution 30 may generally correspond to the light field distribution formed by beams 13 shown in FIG. 1. The light field distribution 30 generally produces a plurality of distinct light fields 36 that are scanned in the direction of arrows 38. The combination of these fields 36 forms an overall scanning swath, S.

The field distribution 30 may be widely varied. In the illustrated embodiment, the fields 36 are spatially separated relative to one another. That is, each of the fields 36 are isolated from other fields so that they do not overlap any portion of an adjacent field (in the direction of the incident light). As should be appreciated, it would be difficult to collect each of the individual fields at the projection unit if the fields were not isolated in this manner. Furthermore, the fields 36 are staggered so that adjacent fields step back in fourth relative to one another (e.g., offset). The staggered fields are generally positioned so that a portion of them covers an edge of an adjacent field in the scanning direction, thus ensuring that the scanning swath, S, is scanned without missing any areas therebetween. That is, although the fields are spatially distinct, they sweep together across the surface of the substrate painting a continuous image. Furthermore, the shape of the fields may be widely varied. For example, they may be square, rectangular, circular, triangular, and the like. In the illustrated embodiment, the fields 36 are trapezoidally shaped. It should be noted that this particular field distribution is not a limitation and that the field distribution may vary according to the specific needs of each lithography system.

FIG. 3 is a simplified block diagram of an inspection system 100 for inspecting a projection unit 102, in accordance with one embodiment of the present invention. The inspection system 100 is generally configured to perform optical tests for determining the image quality of each of the optical subsystems (not shown in this figure) of the projection unit 102. By way of example, the projection unit 102 may generally correspond to the projection unit shown in FIG. 1. The optical tests are generally performed with a test mask 106 having one or more measurable test patterns formed thereon. The number of test patterns generally corresponds to the number of optical subassemblies of the projection unit 102. The test patterns are generally configured to identify imperfections in the optical subsystem that may displace the images produced therethrough. In one embodiment, each of the test patterns may include an array of test marks for helping determine image displacement in the X, Y and Z directions. By way of example, the test marks may be alignment targets (X and Y directions) and/or focus targets (Z direction). As should be appreciated, if the optical subsystems have distortions, the alignment marks may be displaced in the X and Y directions. In addition, if the optical subsystems have aberrations, astigmatisms and the like, the alignment marks may be displaced in the Z direction.

Unfortunately, the test mask 106, as well as the inspection system 100 itself, may have errors in the form of imperfections, defects and deviations that if not otherwise compensated for through calibration would adversely effect the outcome of the tests. For example, the test mask 106 may be large and thus it cannot be made or measured to the accuracy that is important to making good optics. Therefore, the inspection system 100 is also configured to test the test mask 106 before (or after) testing the optical projection unit 102 so that any errors in the test mask 106 or inspection system 100 can be removed (or calibrated) from the test results of the projection unit 102. That is, the inspection system 100 is configured to calibrate by measuring the test mask 106 directly and then comparing that with the results obtained through the optics 102. Errors in the test mask 106 are removed by the comparison.

To elaborate, the optical tests performed by the inspection system 100 are generally arranged to produce a first test data associated with the test mask 106 and inspection system 100 and a second test data associated with the test mask 106, inspection system 100 and projection unit 102. The first test data can be compared with the second test data to determine the image quality of each of the optical subsystems of the projection unit 102. The first test data essentially provides a calibration data for helping determine the actual image displacement of the optical subsystems. By way of example, and referring to FIG. 3B, for a given optical subsystem and using x and y coordinates, if the first test data 103 includes a first mark position at 0,0, and the second set of data 105 includes the same first mark position at 0,1 (e.g., image of mark), then the inspection system tends to know that the optical subsystem is off with respect to the mask and inspection system in the +Y direction by 1. In addition, if the first test data 103 includes a second mark position at 2,2, and the second set of data 105 includes the same second mark position at 1,2 (e.g., image of mark), then the inspection system tends to know that the optical subsystem is off with respect to the mask and inspection system in the −X direction by 1.

Referring back to FIG. 3A, the inspection system 100 includes a mask assembly 104, a detector assembly 110, a position locator assembly 120 and a control assembly 130. The mask assembly 104 is capable of holding and moving the test mask 106 to multiple test positions. For example, the mask assembly 104 may be configured to move the test mask 106 to a calibration position for measuring the test patterns of the test mask 106 and a measurement position for measuring the image of the test patterns of the test mask 106 as projected through the projection optics 102.

The detector assembly 110 is capable of measuring the test patterns of the test mask 106 and the image of the test patterns of the test mask 106 as projected through the projection optics 102. The detector assembly 110 includes one or more detector mechanisms 112 for measuring the one or more test patterns of the test mask 106 (as shown by arrow 114) and the one or more projected images 109 of the test patterns (as shown by arrow 116). By way of example, the projected image 109 may be the aerial image produced by each of the optical subsystems of the projection unit 102. The number of detector mechanisms 112 generally corresponds to the number of optical subsystems of the projection unit 102. The detector mechanisms 112 may be widely varied. For example, the detector mechanisms 112 may have imaging and/or confocal elements. Imaging elements are generally used to measure distortion characteristics in the X and Y directions while confocal elements are generally used to measure focus characteristics in the Z direction.

The detector assembly 110 is also capable of moving in the X, Y and/or Z directions during inspection so as to measure the test marks contained within the test patterns of the test mask 106 (or images 109 thereof). In most cases, the detector assembly 110 is moved so that the detector mechanisms 112 sequentially measure an array of test marks (or images thereof) located within the test pattern (or image thereof). For example, the detector mechanisms 112 may be moved from a first mark to a second mark and so on within the test pattern or image thereof. For example, referring to FIG. 3B, the detector mechanisms may be moved from the first mark 0,0 to the second mark 0,1 within the first set of data 103.

In one embodiment, the detector assembly 110 includes a plurality of detector mechanisms that are ganged together so as to gather data at the same time as the detector assembly scans. Each individual detector mechanism measures a distinct test pattern at the same time. That is, multiple detector mechanisms are configured to measure multiple test patterns simultaneously. This generally produces fast throughput and minimum drift. For example, it reduces the amount of time needed to scan all of the test patterns, i.e., it may take a long time to scan multiple test patterns with a single detector.

Referring back to FIG. 3, the position locator assembly 120 is capable of providing positional information associated with the mask and detector assemblies 104, 110. For example, the position locator assembly 120 may provide positional information corresponding to the calibration and measurement positions of the mask assembly 104. In addition, the position locator assembly 120 may provide positional information corresponding to the testing positions of the detector assembly 110.

The positional locator assembly 120 is generally configured to measure one or more degrees of freedom of the mask and detector assemblies 104, 110. For example, the position locator assembly 120 may be configured to provide positional information in the X, Y and/or Z directions as well as the rotational $\theta_x$, $\theta_y$, $\theta_z$ directions. In one embodiment, 6 axis interferometry is used to track the position of the detector assembly. In order to obtain the positional information, the position locator assembly 120 generally includes one or more positional sensors 122 for monitoring the positions of the mask and detector assemblies. By way of example, the positional sensors may include interferometers, capacitance sensors and the like. The positional sensors generally include a pair of components A and B that cooperate with one another to determine the position of the assemblies. For example, in the case of interferometers sensors, the interferometers sensors include a laser component and a mirror component. The position of these components may be widely varied. For example, they may be positioned on the mask assembly, detector assembly or some other portion of the inspection system (e.g., a fixed member).

The control assembly 130 is capable of controlling the various components of the of the inspection system 100. For example, the control assembly 130 may be arranged to act as a master controller of the inspection system 100, i.e., commands may be issued to and status may be monitored from the various components so as to facilitate completion of assigned tasks. In the illustrated embodiment, the control assembly 130 is operatively coupled to the mask assembly 104, the detector assembly 110 and the position locator assembly 120. The control assembly 130 may include capabilities for, but not limited to, retrieving positional information from the position locator assembly 120, providing control signals to move the mask and the detector assemblies 104 and 110, retrieving measured data (e.g., first and second data) from the detector assembly 110, storing the positional information and measured data, processing the positional information and measured data, and/or the like.

In one embodiment, the control assembly 130 includes processing steps that calibrate out errors in the test mask and/or inspection system. In essence, the control assembly subtracts the first test data from the second test data to compensate for errors in the mask and inspection system. That is, during processing, distortions in the mask and detectors may be calibrated out of the test results to produce test results that more accurately describe the distortions in the projection unit. In one implementation, the control assembly stores calibration data and measured data, subtracts calibration data from measured data to determine actual data, and outputs this information for further processing.

Although not shown, the inspection system 100 may also include a computer system for resolving or analyzing information and/or data retrieved by the control assembly so as to determine any adjustments that are needed. The computer system may be a part of the control assembly or it may be a distinct element. The computer system is generally configured to run an algorithm with the first and second data or resultant data therefrom for determining any adjustments that need to be made. For example, the algorithm may determine that a lens needs to be adjusted. Not only does the algorithm take into account the relative positions of each data point, but also the data points relative to one another. The computer system is generally arranged to inform an operator of the desired adjustment. In most cases, its an iterative process, i.e., the operator makes the adjustment and tests it again until the optical subsystems reach a certain limit that is acceptable.

Figure 4:
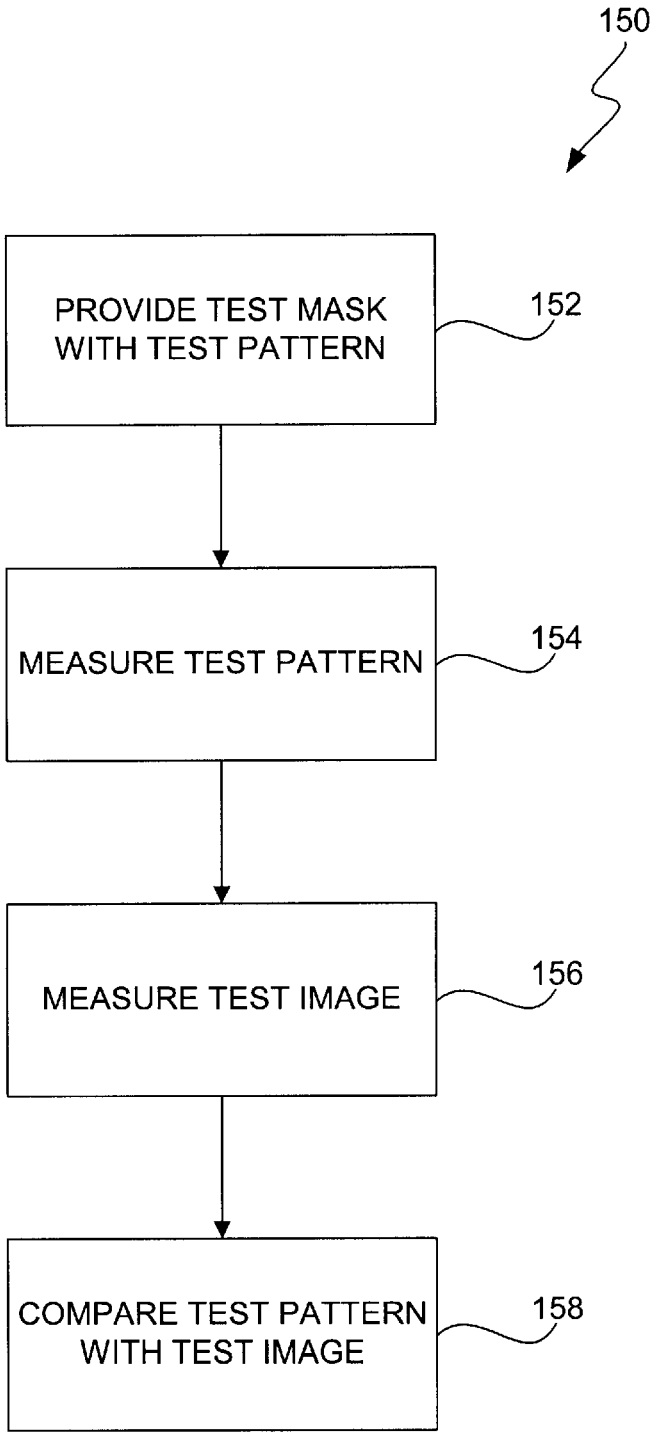
FIG. 4 is a flow diagram of an inspection method, in accordance with one embodiment of the present invention.

FIG. 4 is a flow diagram of an inspection method 150, in accordance with one embodiment of the present invention. By way of example, the inspection method may be implemented via the inspection system of FIG. 3. The inspection method 150 is generally configured to help determine the optical characteristics of a projection unit. By way of example, the optical characteristics may include focus plane, astigmatism, distortion, aberrations and the like. In most cases, a test mask is used to perform optical tests associated with determining the optical characteristics on the projection unit. The optical tests are used to provide feedback for making adjustments to the projection unit under test. For example, the optical tests may indicate that a lens in the optical subsystem is not aligned properly.

The inspection method generally begins at block 152 where a test mask is provided. The test mask generally includes one or more test patterns that are located at various positions on the test mask. The number of test patterns generally corresponds to the number of optical subsystems of the projection unit being inspected. That is, there is generally a test pattern for each field used by the lithography system from which the projection unit is taken. The test pattern is generally configured to be contained within the field of view of the optical subsystems of the projection unit. Each of the test patterns includes one or more test marks that provide measurable information in the X, Y and Z directions. By way of example, test marks associated with measurable information in the X and Y direction may be used to determine distortion and test marks associated with measurable information in the Z direction may be used to determine misfocus. In one implementation, the X and Y test marks are in the form of crosses while the Z test marks are formed by reflective surfaces.

After providing the test mask, the process flow proceeds to block 154 where the test patterns of the test mask are measured. During measurements, the test mask is generally positioned in a plane that coincides with the image plane of the projection optics under test. The measurements are typically performed using various detector arrangements capable of measuring different optical characteristics. By way of example, the test patterns may be measured with the detector mechanisms of FIG. 3. The number of detectors in each of the detector arrangements generally corresponds to the number of optical subsystems of the projection unit under test. For example, if the projection unit includes seven optical subsystems then each of the detector arrangements includes 7 detectors. In one implementation, multiple detectors are used to simultaneously measure multiple test patterns. That is, the individual detectors may be moved together as a group at the same time with each individual detector measuring test marks contained within individual test patterns.

In one embodiment, position measurements are performed. This is generally accomplished by illuminating the test mask and capturing an image of the test marks with measurable information in the X and Y directions. Illumination may be implemented by an illumination unit disposed behind the test mask and capturing may be implemented by imaging detectors disposed in front of the test mask. By way of example, the test marks may be imaged with a CCD. The captured image is typically smaller than the field of view, but larger than the test marks. Standard image processing generally finds the position of each of the test marks within the captured image and a position locator system generally measures the position of the imaging detectors during imaging of the test marks. In one implementation, the relative position of each of the test marks contained within an individual test pattern is sequentially measured by an individual imaging detector.

In another embodiment, focus measurements are performed. This is generally accomplished by a confocal detector arrangement. In one implementation, the confocal detector arrangement includes a light source, an analyzing reticle and a detector. The light source illuminates the analyzing reticle. Thereafter, the light is focused onto the test mask, and more particularly a focus region of the test mask (e.g., a reflecting area-no pattern) with measurable information in the Z direction, and the light reflecting off of the test marks is passed back through the analyzing reticle and onto the confocal detector. By way of example, the focus region may be formed from a reflecting material such as chrome. The analyzing reticle is configured to effect the light incident on the detector in accordance with the focus quality. Similarly to above, a position locator system generally measures the position of the confocal detectors during measurements therewith. In one implementation, the test marks are measured in a sequential manner (e.g., from one mark to another).

After measuring the test mask, the process flow proceeds to block 156 where the projected image of the test pattern is measured. In most cases, each of the optical subsystems of the projection unit is configured to project an individual test pattern of the test mask. The projected image is generally positioned at the aerial image plane of the projection optics under test. The projected image measurements are typically similar to the test pattern measurements. That is, the same position and focus measurements are performed. In addition, the same detector arrangement is used.

After measuring the test image, the process flow proceeds to block 158 where the test pattern is compared with the test image. By comparing the test pattern to the test image, imperfections associated with the test mask and inspection system may be calibrated out of the test image so that the actual optical characteristics associated with the optical subsystem under test may be determined. Once the optical characteristics are determined, any needed adjustments based on the actual optical characteristics may be performed on the optical subsystem under test.

Figure 5:
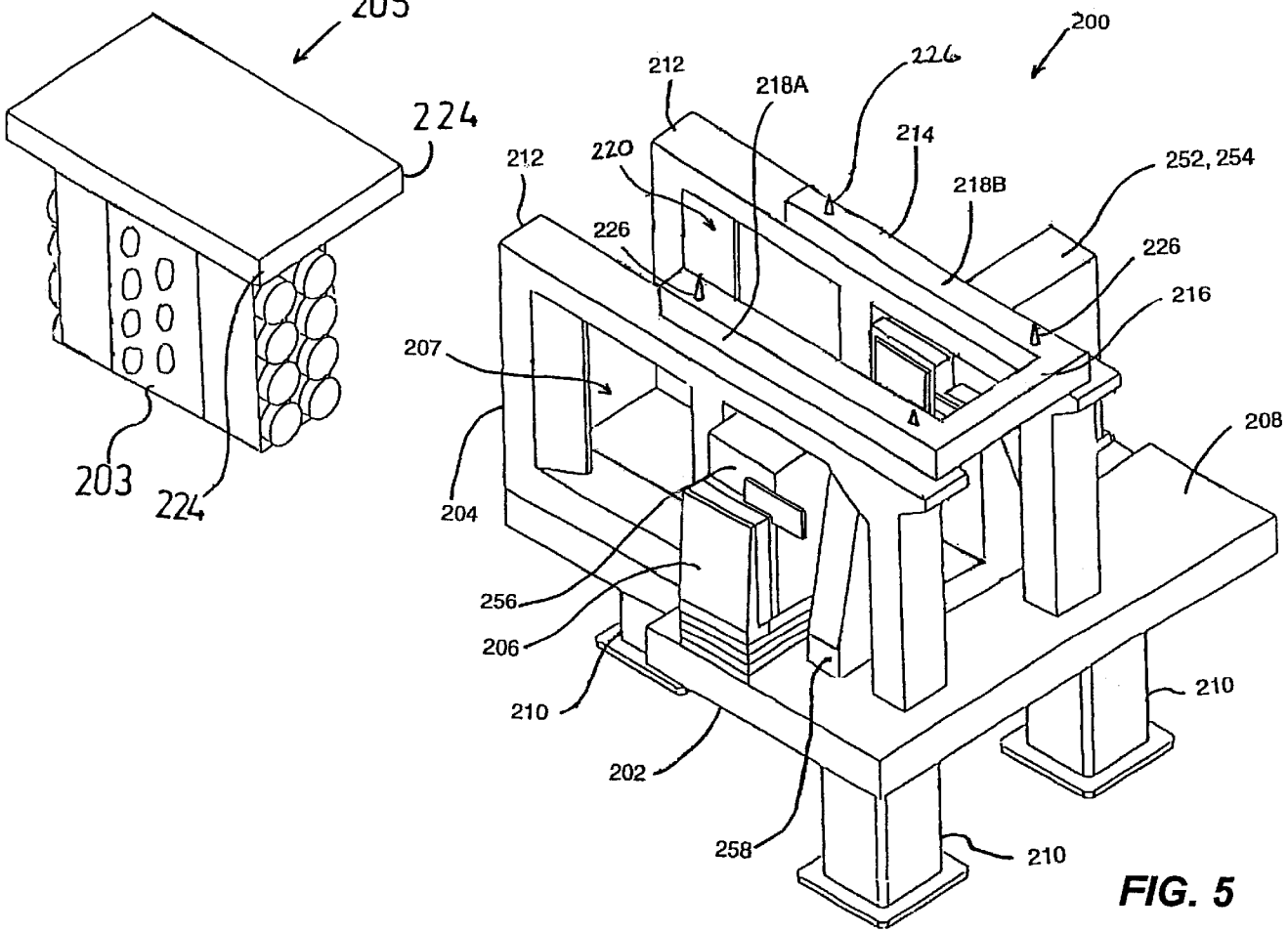
FIG. 5 is a perspective diagram of an inspection tool and a projection unit, in accordance with one embodiment of the present invention.

FIG. 5 is a perspective diagram of an inspection tool 200, in accordance with one embodiment of the present invention. The inspection tool 200 is generally configured to test multiple optical subsystems at the same time so that a projection unit 205 can be rapidly adjusted and certified in the factory. By way of example, the projection unit 205 may correspond to the projection unit 20 shown in FIG. 1. In the illustrated embodiment, the projection unit 205 includes 7 optical subsystems 203, each of which is supported within a frame of the projection unit 205.

The inspection tool 200 generally includes a structural chassis 202, a support arrangement 204, and a lens calibration system 206. Broadly, the structural chassis 202 provides support to the support arrangement 204 and the lens calibration system 206. The support arrangement 204 provides support to a projection unit 205. The lens calibration system 206 performs optical tests on the projection unit 205.

More particularly, the structural chassis 202 includes a base 208 for supporting the support arrangement 204 and lens calibration system 206 thereon, and a plurality of isolation units 210 for supporting the base 208 relative to the ground. In the illustrated embodiment, the base 208 is isolated from the ground by means of three vibration isolation units 210A–C. As should be appreciated, three isolation units are used to avoid the possible structural deformation caused by the typical arrangement of four isolators (in which case two of the isolators are slaved together). The projection unit 205 is typically very heavy and therefore it is important that the weight of it not distort the base 208. This is typically accomplished by using a massive base that tends not to distort under the load of the projection unit 205. By way of example, the base 208 may be formed from a suitable structural material such as cast iron.

Furthermore, the support arrangement 204 is generally arranged to locate the projection unit 205 relative to the lens calibration system 206 and an adjustment window 207. The adjustment window 207 provides space in which the projection unit 205 can be worked on without removing the projection unit 205 from the inspection tool 200. The projection unit support arrangement 204 generally includes a pair of pedestal units 212 and a carriage 214 that suspends the projection unit 205 in a vertical direction (e.g., Y-axis). The pedestal units 212 are structurally attached to the base 208 and the carriage 214 is movably attached to the pedestal units 212. By way of example, the pedestal units 212 may be attached to the base 208 via bolts, and the carriage 214 may ride on the top of the pedestal units 212 via air bearings. Similar to the base 208, the pedestal units 212 and carriage 214 may be formed from a suitable structural material such as cast iron.

The carriage 214 is generally configured for receiving and holding the projection unit 205. In the illustrated embodiment, the carriage 214 is U-shaped, such that the carriage 214 includes a base section 216 and two arms 218 A and B extending therefrom. An open end 220 of the carriage is generally configured for allowing the projection unit 205 to be placed between the extended arms 218A&B. Furthermore, a top surface 222 of the carriage 214 provides a surface for allowing the projection unit 205 to be placed thereon. For example, the projection unit 205 may include support cones 224 that are configured to rest on the top surface 222.

In most cases, the carriage 214 is configured to precisely position the projection unit 205 thereon in the X, Y and Z directions. In one implementation, the carriage 214 and projection unit 205 may include datum or reference surfaces for placing the projection unit 205 in a predetermined position relative to the carriage 214. For example, the carriage 214 may include a X-Z planar surface configured for abutting or contacting a X-Z planar surface of the projection unit 205 thereby precisely holding the projection unit 205 in the Y direction. Additionally or alternatively, the carriage 214 may include reference pads that are configured to contact specific location(s) on the projection unit 205 to place the projection unit 205 in a predetermined position relative to the carriage 214. For example, the reference pads may include cones 226, which extend from the top surface 222 of the carriage 214, and which are configured for placement in openings located on the cones 224 of the projection unit 205 thereby precisely holding the projection unit 205 in the X, Y and Z directions. Additionally, the reference pads may be configured to move up and down so as to allow for some adjustment.

Figure 6A:
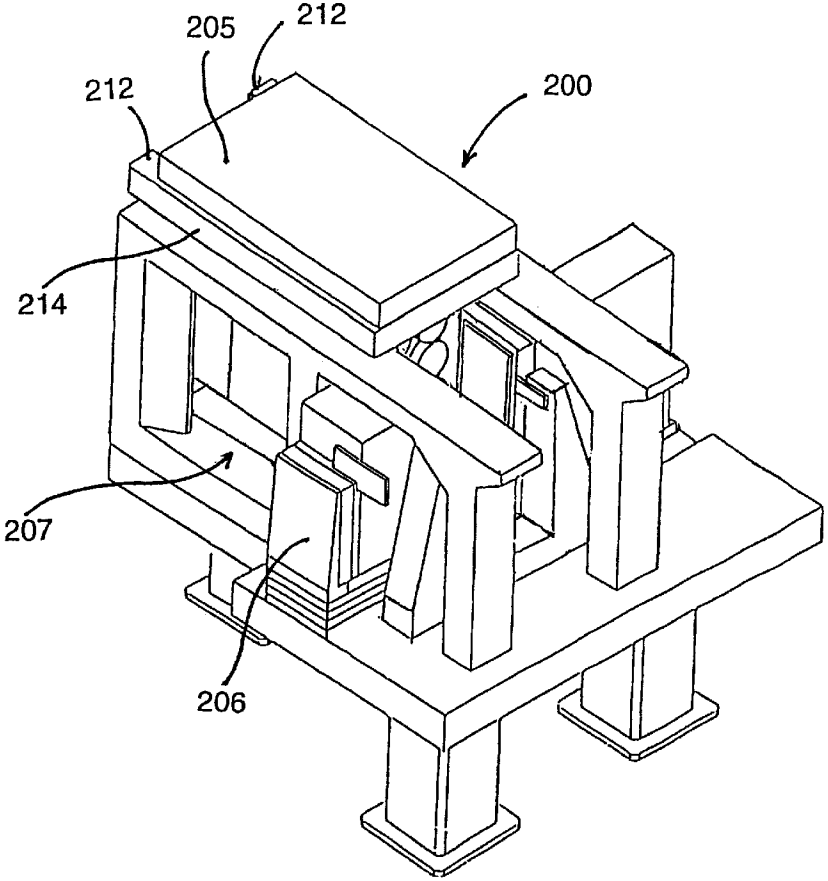
FIGS. 6A is a perspective diagram of an inspection tool with the projection unit in an adjustment position, in accordance with one embodiment of the present invention.
Figure 6B:
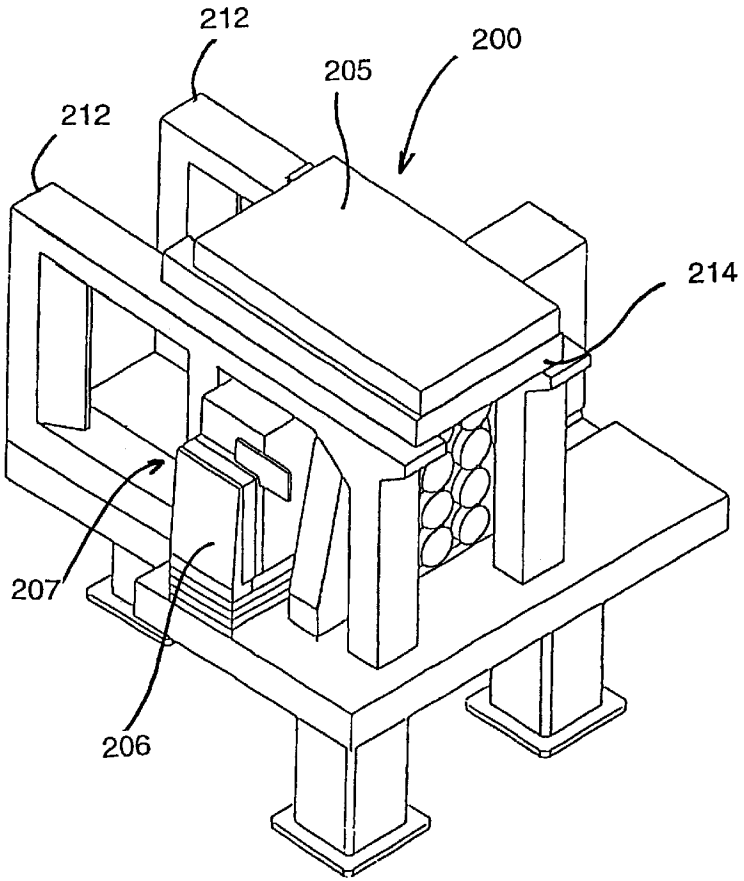
FIGS. 6B is a perspective diagram of an inspection tool with the projection unit in a test position, in accordance with one embodiment of the present invention.

Referring to FIGS. 6A and B, the carriage 214 is configured to slide along the pedestal units 212 in a linear direction between a test position, placing the projection unit 205 in a position to be tested (as shown in FIG. 6B), and an adjustment position, placing the projection unit 205 in a position to be adjusted (as shown in FIG. 6A). In the illustrated embodiments, the test position places the projection unit 205 relative to the lens calibrating system 206, and the adjustment position places the projection unit 205 relative to the adjustment window 207. The adjustment window 207 is generally defined by an opening in the pedestal units 212. Thus, the window 207 allows an operator access to various internal components enclosed inside the projection unit 205. By way of example, the window 207 may allow an operator to make adjustments to the plurality of optical subsystems that contain lenses, prisms, mirrors and/or the like. As should be appreciated, the two-position tool allows fast and accurate adjustment of the projection unit 205, i.e., the projection unit can be tested and adjusted in the same place thus increasing the speed and accuracy. Although not shown, the carriage 214 may be driven by an actuator so as to locate the projection unit 205 in the correct position for testing and adjusting.

Figure 7:
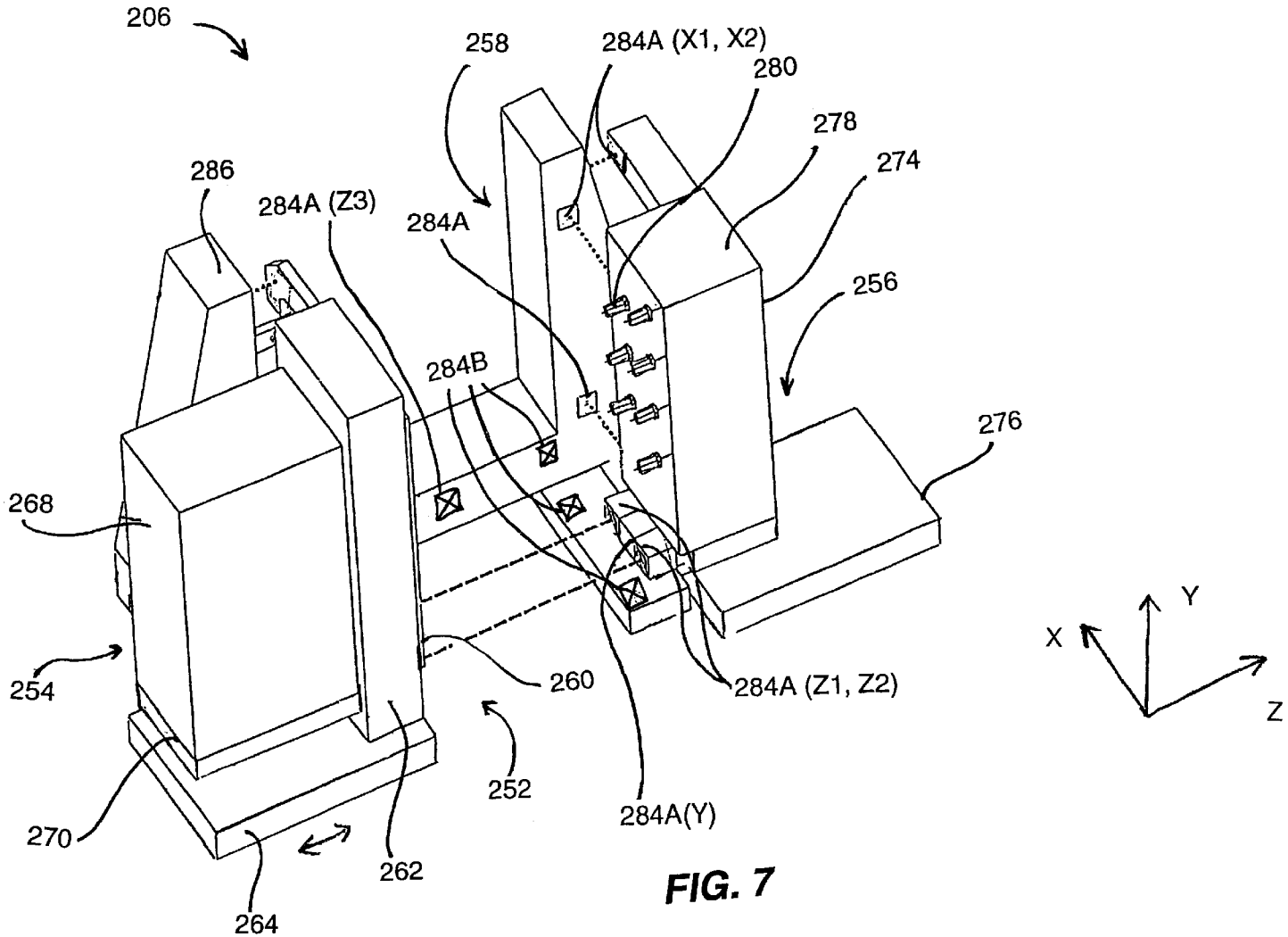
FIG. 7 is a perspective diagram of a lens calibrating system in a first mode, in accordance with one embodiment of the present invention.
Figure 8:
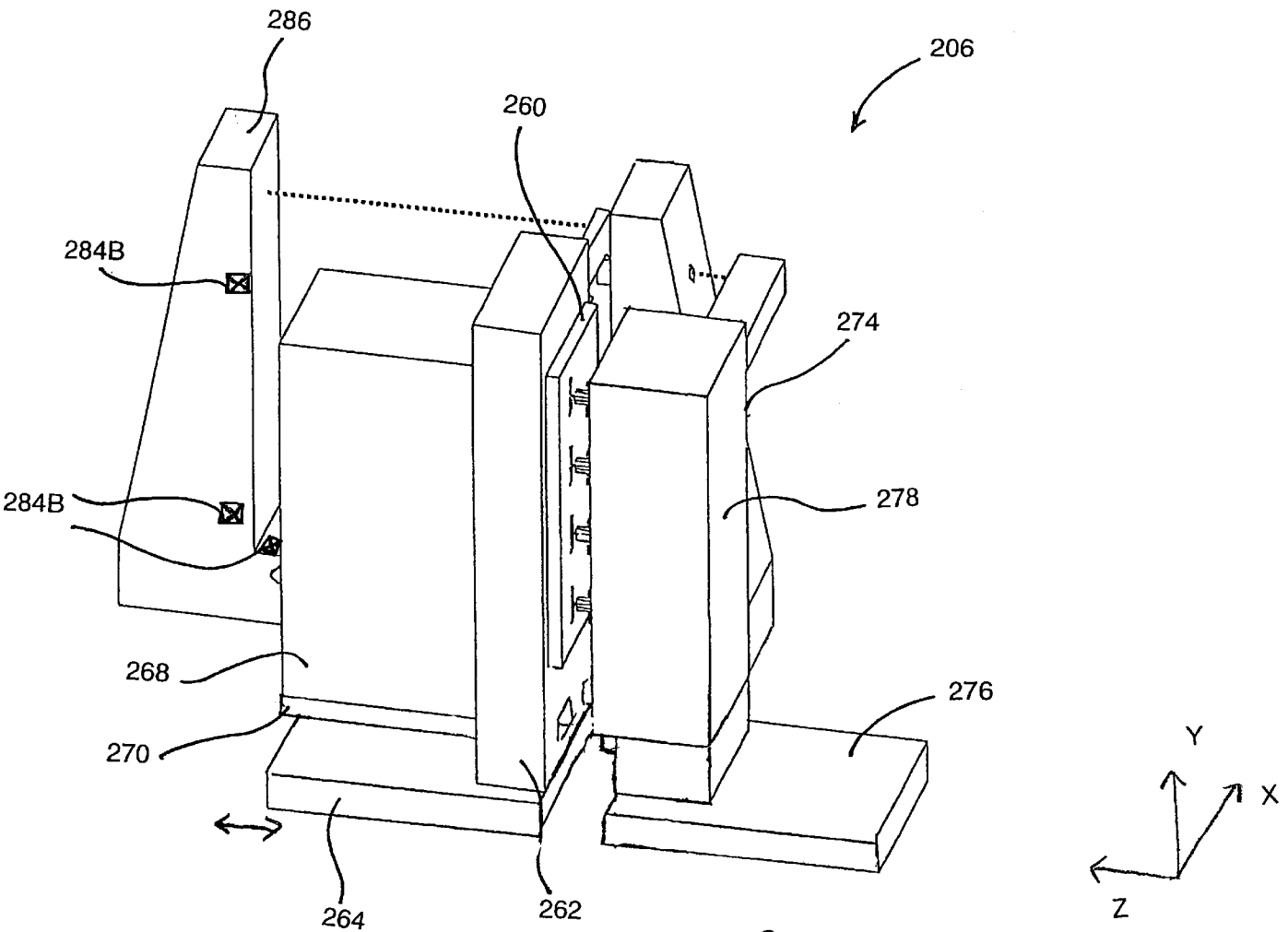
FIG. 8 is a perspective diagram of a lens calibrating system in a second mode, in accordance with one embodiment of the present invention.

Referring to FIGS. 7 and 8, the lens calibrating system 206 will be described in greater detail. The lens calibrating system 206 is generally configured for inspecting the projection unit 205. By way of example, the lens calibrating system 206 may correspond to the inspection system 100 shown in FIG. 3. FIG. 7 shows the lens calibrating system 206 in a measurement mode and FIG. 8 shows the lens calibrating system 206 in a calibration mode. The measurement mode generally corresponds to a configuration that allows the projected image of the projection unit to be measured (for ease of discussion the projection unit is not shown). The calibration mode, on the other hand, generally corresponds to a configuration that allows the pattern on a mask to be measured. The measured data can thus be compared to determine the optical characteristics of the projection unit. That is, the data associated with the test mask can be calibrated out of the data associated with the projection unit to produce a resultant set of data that corresponds to the actual optical characteristics of the projection unit. By determining the optical characteristics of the projection unit 205, the projection unit can be adjusted (if needed) to remove any possible problems therewith so as to ensure precise manufacturing of a product when the projection unit is used in a lithography system.

The lens calibration system 206 generally includes a mask assembly 252, an illumination assembly 254, a detector assembly 256 and a position locator assembly 258 that cooperate to help determine the optical characteristics of the projection unit 205. The mask assembly 252 is configured to carry a test mask 260 for measurements thereof. The mask assembly 252 includes a mask holder 262 attached to a mask stage 264. The mask holder 262 is configured to hold the test mask 260 thereto. The mask holder 262 may be widely varied. For example, the mask holder 262 may include a vacuum chuck, a mechanical chuck, an electrostatic chuck and the like, for securing the test mask thereto. The mask stage 264 is configured to move the mask holder 262 and thus the test mask 260 between a measurement position and a calibration position. The measurement position generally corresponds to the measurement mode and thus test mask 260 is moved back to provide space for placement of the projection unit 205 between the mask and the detector assembly 252, 256 so that the projection unit 205 may be inspected (as shown in FIG. 7). The calibration position, on the other hand, generally corresponds to the calibration mode and thus the test mask 260 is moved forwards towards the detector assembly 256 so as to place the mask in a position to be inspected (as shown in FIG. 8).

The mask stage 264 is generally configured to move relative to the body 208 in a linear direction. By way of example, the stage 264 may be capable of moving in the X, Y or Z directions. In the illustrated embodiment, the mask stage 264 moves back and forth in the Z-direction. In addition, the stage 264 may be movably coupled to the body 208 via an anti-friction device (not shown), which allows substantially free movement thereof. By way of example, the anti-friction device may include air bearings, fluid bearings, roller bearings or the like. In one embodiment, the mask stage 264 is supported on a guide arrangement by three kinematically placed air bearings. By way of example, the guide arrangement may be a V and flat guide arrangement. Furthermore, the mask stage 264 may be moved via a stage drive unit (not shown) such as a linear servo-motor, a ball screw motor, voice coil motor (VCM), an E-I core actuator, a pneumatic motor, hydraulic motor or the like. In one embodiment, the mask stage 264 is moved via a rod-less air cylinder having a stroke that is precisely stopped by micrometers. Moreover, the stage drive unit may be coupled to a position controller (not shown), which provides force command signals for driving the stage drive unit. By way of example, the position controller may be included in the control system of the inspection system.

The illumination assembly 254 is configured to illuminate the test mask 260 during measurements thereof. The illumination assembly 254 generally includes an illumination unit 268 attached to an illumination stage 270. The illumination unit 268 is arranged to both generate and direct a plurality of light beams (fields) through the test mask 260. The number of light beams generally corresponds to the number of optical subsystems of the projection unit 205. Any suitable illumination unit 268 may be used. In one embodiment, the illumination unit 268 is similarly configured to the illumination unit of the lithography system in which the projection unit is used. For example, the illumination unit 268 may be similar to the illumination unit 16 used in the lithography system 10 of FIG. 1, i.e., the illumination unit 268 closely matches the functionality of the illumination unit 16.

The illumination stage 270 is configured to follow the mask assembly 252 so as to illuminate the test mask 260 with the illumination unit 268 when the mask assembly 252 is moved between the calibration and measurement positions. Although the illumination stage 270 moves independent of the mask stage 264, the illumination stage 270 may be similarly configured to the mask stage 264. For example, the illumination stage 270 may be configured to move relative to the body 208 in a linear direction. The linear direction generally corresponds to the direction of the mask stage 264, and thus in the illustrated embodiment the illumination stage 270 moves back and forth in the Z-direction. In addition, the illumination stage 270 may be movably coupled to the body 208 via an anti-friction device, which allows substantially free movement thereof. By way of example, the anti-friction device 116 may include air bearings, fluid bearings, roller bearings or the like. The illumination stage 270 may also be moved via a stage drive unit. Alternatively, the illumination unit 268 may be configured to move with the mask stage 264 rather than with its own individual stage 270.

The detector assembly 256 is configured to perform optical measurements relating to the test mask 260 and the projection unit 205. That is, the detector assembly 256 is configured to measure the test pattern on the test mask 260 and the image of that test pattern projected by the projection unit 205. By measuring the patterns and images, the actual optical characteristics of the projection unit can be determined. As shown, the detector assembly 256 is positioned opposite, but in line with the mask assembly 252. The detector assembly 256 includes a detector box 274 attached to a detector stage 276. The detector box 274 includes a plurality of detector units 278, which are rigidly connected together in the detector box 274. The detector units 278 are configured to scan together and to make simultaneous measurements in all seven fields of the projection unit during movement thereof by the detector stage 276.

Each of the detector units 278 includes an objective lens 280 and a confocal and imaging subsystem (not shown in these figures) for measuring the pattern and image. The objective lens 280 is operatively coupled to both the confocal subsystem and the imaging subsystem. The objective lens magnifies a small part of the aerial image onto detectors. The objective lens 280 are positioned on the outer shell of the detector box 274 and the confocal and the imaging subsystems are positioned inside the detector box 274. The objective lens 280 are configured to focus the measuring optics associated therewith on the image plane (e.g., the plane in which the test patterns and test images reside). The confocal subsystem is configured to measure optical characteristics associated with focus (e.g., focal plane and astigmatism) and the imaging subsystem is configured to measure optical characteristics associated with distortion and aberrations (e.g., spherical and coma). The imaging system measures X and Y displacement and the confocal measures Z displacement. The detector units will be described in greater detail below.

The detector stage 276 is configured to move the detector box 274 relative to the rigid body 208 so as to move the detector units 278 in positions for measuring the test mask 260 and the projected image of the test mask 260. Each detector can measure a limited part of each optical field. The stage 276 allows the detector array to reach all parts of each field. In the illustrated embodiment, the detector stage 276 moves in the X, Y and Z-directions so as to allow the detector units 278 to measure the test mask and projected image in the X, Y and Z directions. That is, during measurement, the detector units 278 are moved in the X, Y and Z-directions to measure specific targets associated with the test mask 260 and the projected image therof. By way of example, the specific targets may include alignment targets and focus targets, which are positioned at various locations within test pattern of the test mask. The alignment targets are generally used to determine shifts in the X and Y directions, and the focus targets are used to determine misfocus. By way of example, the alignment targets may be formed as crosses and the focus targets may be formed from reflective surfaces. Each detector needs to be repositioned over all parts of each field. Thus, the stage X and Y motion is generally limited to the size of each field (trapezoid).

In most cases, the test mask 260 includes a test pattern for each of the optical subsystems of the projection unit 205. During the calibration and measurement steps, the detector stage 276 moves the individual detector units 278 in a sequenced manner between the specific targets so as to measure the location. For example, there may be a number of sites within each field of the projection unit where the detectors are moved to perform optical measurements (the entire field is not measured in one shot). In most cases, the detectors 278 are moved in a relative sort of way. For example, during position measurements, the detectors 278 may be moved approximately to each of the test marks contained in the test pattern, i.e., moved to an X and Y location in close proximity of the particular alignment target that is desired to be measured. Standard image processing may be performed by the control system of the inspection system to find the exact position of each of the test marks if the location of the detector is not centered on the test mark (e.g., there is offset).

Any multi-positional X, Y and Z drive unit may be used in the detector stage 276. In one embodiment, the motion of the detector stage is provided by rails with recirculating balls, driven by DC motors through lead screws. By way of example, a drive unit such as this may be provided by the Daedal a division of Parker Hannifin Corporation of Irwin, Pa. The stage drive unit may be coupled to a position controller (not shown), which provides force command signals for driving the stage drive unit. By way of example, the position control may be provided through linear encoders. The range of drive unit may vary according to the specific needs of each lens calibration system.

The position location assembly 258 is configured for monitoring the positions of the mask and detector assemblies 252 and 256 during measurement of the mask 260 and projection unit 205. The position location assembly 258 includes a plurality of position sensing units 284. Some of the position sensing units 284 are configured to monitor the positions of the detector assembly 256 as it scans the test mask 260 and images thereof while others are configured to monitor the position of the mask assembly 252 when its in the calibration and measurement positions. The position sensing units 284 may be widely varied. For example, the position sensing units 284 may be made up of any combination of interferometers, capacitance sensors, encoder sensors, potentiometer sensors, inductive sensors, linear scales and the like.

The position sensing units 284 are generally arranged to measure the positions of the assemblies relative to a reference point. The reference point may be widely varied. For example, the reference point may be defined by the assemblies themselves, some portion of the frame that supports the system or some component that is external to the system 200. In one embodiment, the position location assembly 258 includes a reference frame 286 configured to provide a precise reference point relative to the mask assembly 252 and the detector assembly 256. The reference frame 286 is a separate component of the carriage and support structure and thus the projection optics 205 will not distort the reference frame 286. As shown, the reference frame 286 is positioned to the side of the mask and detector assemblies 252, 256. The reference frame 286 includes an opening defined by upwardly extending arms. The opening provides a space for allowing the projection unit 205 to be positioned between the mask and detector assemblies 252, 256. The reference frame 286 also includes an arm extending underneath the detector assembly 256. Each of the arms provides a reference surface for at least a portion of the position sensing units 284. Although not shown in FIGS. 7 and 8, the reference frame 286 may be fixed to the rigid body 208. The reference frame 286 is designed to remain stable during detector assembly scanning.

The position sensing units 284 are generally arranged to measure the positions of the mask assembly 252 and detector assembly 256 relative to the reference frame 286, as well as the positions of the mask assembly 252 and detector assembly 256 relative to each other. In the illustrated embodiment, the position sensor units 284 consist of a first sensor arrangement (designated with an A) and a second sensor arrangement (designated with a B).

The first sensor arrangement 284A is configured to measure the position of the detector assembly 256 relative to the reference frame 286 and relative to the mask assembly 252 during measurements of the test pattern and image. That is, the first sensor arrangement 284A is configured to track the position of the detector assembly 256, and more particularly the positions of each of the detector units 278 during measurement therewith. In one embodiment, the first sensor arrangement 284A includes a plurality of interferometers that provide 6 axis interferometry. In particular, the interferometer sensors are set-up to measure the linear positions of the detector assembly 256 in the in x y z -directions as well as to measure the rotational positions of the detector assembly about the x-axis y-axis and z-axis, i.e., an angle θx, an angle θy and an angle θz, respectively. As should be appreciated, the position of each detector unit 278 can be accurately determined thus assuring testing accuracy in six dimensions. In one implementation, this type of 6 axis interferometry not only allows the position of the detector assembly 256 to be measured while scanning each field, but which also continuously measures the detector assembly 256 during calibration modes.

The interferometer system may be widely varied. In the illustrated embodiment, the interferometer system includes three z direction sensors Z1, Z2, Z3 for determining the position of the detector assembly 256 in the z direction as well as the rotational positions about the x and y axis (to determine the parallelism of the mask and detectors). These may be referred to as Z, roll and pitch interferometers. The Z1–Z3 are configured to continuously measure the mask and detector assembly distance. This measurement is continuous as the mask is moved between calibration and measurement positions. The Z1 and Z2 sensors measure a lower portion of the assemblies and the Z3 sensors measure an upper portion of the assemblies. The Lower Z1 and Z2 interferometers measure directly from detector box to mask stage. The Z3 interferometer, on the other hand, measures indirectly from detector box to mask stage. In one embodiment, the Z3 interferometer is folded around the space that is occupied by the projection optics through the reference frame 286. As should be appreciated, the Z1 and Z3 measurements provide the rotation about the x axis and the Z1 and Z2 measurements provides the rotation about the y axis.

The illustrated interferometer system also includes one y direction sensor Y for determining the position of the detector assembly 256 in the y direction, and two x direction sensors X1 and X2 for determining the position of the detector assembly 256 in the x direction as well as the rotational position about the z axis relative to the reference frame. These may be referred to as Y interferometer and X and yaw interferometers. The Y sensor is configured to measure the third arm of the reference frame 286 and detector box distance while the X1 and X2 are configured to measure the second arm of the reference frame 286 and detector box distance. As shown, the X1 sensors measures a lower portion while the X2 sensor measures an upper portion. As should be appreciated, the X1 and X2 measurements provide the rotation about the z axis.

The second sensor arrangement 284B, on the other hand, is configured to measure the position of the mask assembly 252 relative to the reference frame 286 when the mask assembly 252 is in its two positions. That is, the second sensor arrangement 284B is configured to measure the position of the mask assembly 252 relative to the reference frame 286 when the mask assembly 252 is placed in the measurement position (FIG. 7) and the calibration position (FIG. 8). During the internal scan of a field, it is important that the mask 260 not move in the X and Y directions. This movement is minimized by the rigid construction of the base and the mask stage. It is confirmed by the second sensor arrangement 284B that measures the static distance between the mask holder 262 and the reference frame 286.

In one embodiment, the second sensor arrangement 284B includes a first group of sensors for measuring in measurement position and a second set of sensors for measuring in the calibration position. Each of these groups may be widely varied. In one implementation, each of these groups includes a plurality of capacitance sensors set-up to determine the linear positions of the detector assembly in the in x y directions as well as to determine the rotational position of the detector assembly about the z-axis, i.e., an angle θz. By way of example, the first and second groups may include two x direction sensors for determining the position of the mask assembly in the x direction as well as the rotational positions about the z axis, and one y direction sensor for determining the position of the detector assembly in the y direction. Alternatively, the first and second groups of sensors may include two y direction sensors for determining the position of the mask assembly in the y direction as well as the rotational positions about the z axis i.e., an angle θz, and one x direction sensor for determining the position of the detector assembly in the xdirection. It should be understood, however, that this is not a limitation and that the number of sensors in each direction may vary according to the needs of each inspection tool.

Although not shown in detail in this Figure, capacitance gauges generally consist of two sensor elements that have a small gap. These sensor elements are mounted to the mask holder 262 and the reference frame 286 to measure motion between the mask holder 262 and the reference frame 286. The capacitance gauge measures the distance between two sensor elements.

Figure 9A:
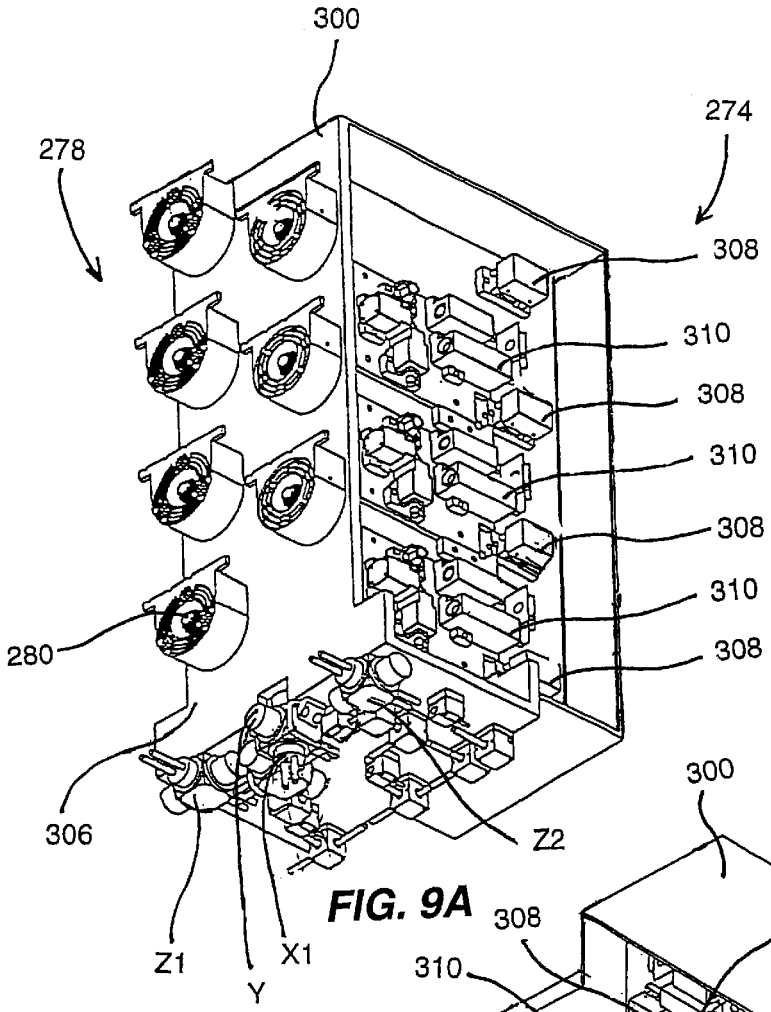
FIGS. 9A and 9B are perspective diagrams of a detector box, in accordance with one embodiment of the present invention.
Figure 9B:
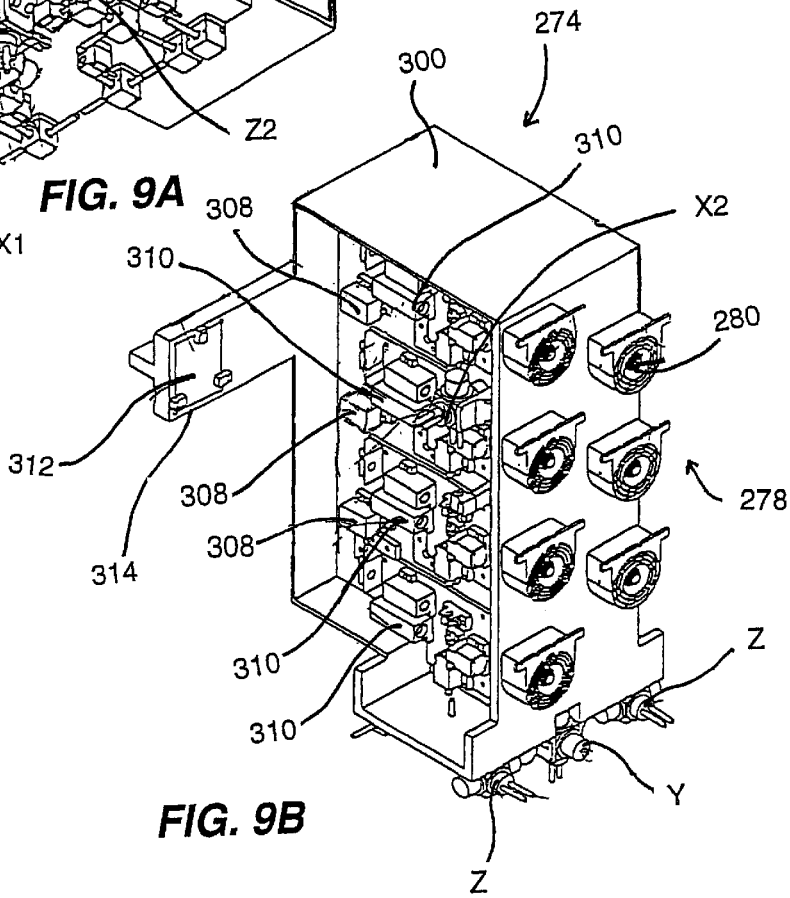

Referring to FIGS. 9A and 9B the detector box 274 will be described in greater detail. FIG. 9A is a perspective diagram showing the detector box 274 from a first side, and FIG. 9B is a perspective diagram showing the detector box 274 from a second side (which is opposite the first side). The detector box 274 includes a housing 300 for supporting the detector units 278. The detector housing 300 may be formed any suitable material. By way of example, the detector housing 300 may be formed from invar for position stability. Invar is a steel nickel alloy with a low thermal coefficient. The detector housing 300 is configured to carry the plurality of detector units 278 for measurement of the mask 260 and projection unit 205. Each of the detector units 278 includes a microscope objective 280, which is attached to a front side of the housing 300. The microscope objectives 280 are configured for focusing the detector units 278 on the image plane to which the test mask 260 is positioned or to which the images thereof are projected. In one embodiment, the objectives 280 have a working distance of 3.7 mm. Even this small distance provides a clearance between the image plane of the projection lens and the detector array.

Each of the detector units 278 also includes an imaging system and a confocal system, which are contained inside the housing 300. For illustration purposes, walls of the housing 300 have been removed to show the imaging system and a confocal system contained therein. As shown, the imaging system includes plurality of CCD cameras 308 and confocal system includes a plurality of confocal detectors 310. Although not shown, each of the microscope objectives 280 is optically coupled to an individual CCD camera 308 and confocal detector 310.

The number of detector units 278 may be widely varied. In one embodiment, the number of detector units 278 corresponds to the number of optical subsystems of the projection unit 205. That is, for each optical subsystem there is a corresponding microscope objective 304, CCD camera 308 and confocal detector 310. In the illustrated embodiment, the detector assembly 256 includes seven detector units 278, of which three are positioned on the right side and four on the left side in the front of the housing 300. They are generally positioned in a similar configuration as the light fields produced by the illumination system and thus the optical subsystems of the projection optics, i.e., they are offset and staggered relative to one another.

The detector assembly 256 also includes a plurality of interferometers for helping to determine the position of the detector assembly 256, and thus each of the detector units 278, during measurements of the mask 260 and projection units 205. In this embodiment, the plurality of interferometers includes a pair of X interferometers (designated X1 and X2), a pair of Z interferometers (designated Z1 and Z2) and a Y interferometer. As shown, the Z interferometers, the Y interferometer and the X1 interferometers are positioned on the bottom of the detector box 274. The X2 interferometer is positioned on an upper portion of the second side of the detector box 274. The X interferometers are spaced apart along a similar axis and positioned on the side of the detector assembly 256 adjacent the reference frame 286. The Z interferometers are spaced apart along a similar axis and positioned on the front of the detector assembly 256 towards the mask assembly 252. Each of these interferometers has a corresponding mirror. For example, the X and Y interferometers have corresponding mirrors that are attached to the reference frame 286, and the Z interferometers have corresponding mirrors attached to the mask stage 264. The detector assembly 256 also includes a mirror 312 for receiving a signal from another Z interferometer (designated Z3). The mirror 312 is position on an arm 314 that extends away from an upper portion of the second side of the detector box 274.

In one embodiment, the CCD cameras have remote electronics so as minimize heat within the detector box.

Figure 10:
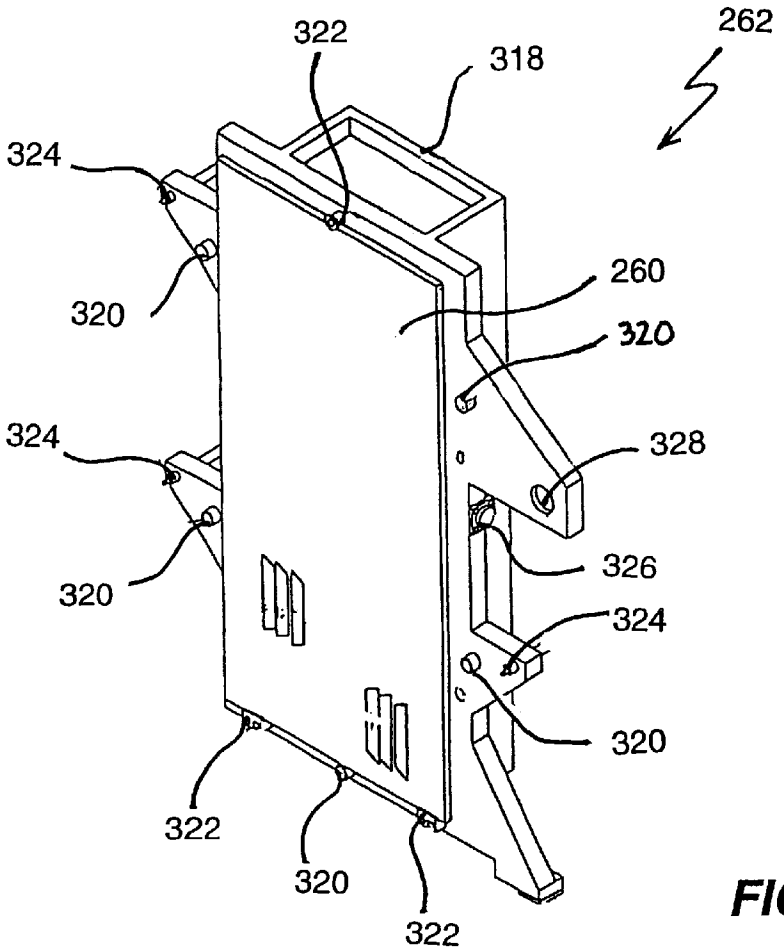
FIG. 10 is a perspective diagram of a mask holder, in accordance with one embodiment of the present invention.

Referring to FIG. 10 the mask holder 262 of the mask assembly 252 will be described in greater detail. The mask holder 262 is generally mounted on top of the mask stage 264, which is not shown in this Figure. The mask holder 262 generally includes a frame 318 that may be formed from any suitable material. By way of example, the frame 318 may be formed from invar. The mask holder 262 is shown holding the test mask 260 thereon. This is generally accomplished with vacuum, i.e., the mask holder 262 includes a chucking surface that includes one or more holes that apply a suction force to the back of the test mask 260.

The mask holder 262 may include one or more locating pins 320. The locating pins provide reference points for positioning the mask 260 on the mask holder 262. The arrangement of locating pins 320 generally corresponds to the number of available patterns on the mask 260. For example, the mask 260 may include one or more adjacent test patterns, each of which can be used to provide a different set of data points. In the illustrated embodiment, the mask 260 includes 3 adjacent patterns.

The locating pins 320 may be widely varied. In the illustrated embodiment, the mask holder 262 includes a pair of spaced apart locating pins 320 on a first side and second side of the mask holder 262, and a single locating pin 320 at a bottom of the mask holder 262. The locating pins 320 on the first side provide a first mask position, and the locating pins on the second side provide a second mask position. A third mask position may be provided between the first and second pair of locating pins 320. The mask 260 may placed at these various positions by sliding it between positions. By way of example, the first mask position may correspond to a first adjacent pattern, the second mask position may correspond to a second adjacent pattern, and the third mask position may correspond to a third adjacent pattern.

The mask holder 262 may also include one or more safety catches 322, which prevent the mask from falling off of the mask holder 262 during loss of vacuum. The safety catches 322 may be widely varied. In the illustrated embodiment, the mask holder 262 includes a pair of spaced apart catches 322 at the bottom of the mask holder 262 and a single catch at the top of the mask holder 262.

The mask holder 262 may also include one or more linear variable differential transformers 324 (LVDTs) configured to measure the distance from the mask holder 262 to the projection unit 205 when the projection unit is placed in the inspection tool 200. The LVDTs 324 may be widely varied. In the illustrated embodiment, the mask holder 262 includes three LVDTs 324. Two of the LVDTs 324 are positioned on the first side of the mask holder 262 in a spaced apart relationship, and a single LVDT 324 is positioned on a second side of the mask holder 262. The LVDT's 324 generally extend to reference pads located on the projection optics 205 to make sure the optics are properly located. The projection unit 205 banks against a micrometer the LVDT 324 simply verifies that its in the right place. As should be appreciated, the system needs to ensure the projection optics are in the right place relative to the detector box, mask holder, etc., in order to provide accurate test results.

The mask holder 262 may also include one or more capacitance sensors 326 or mirrors 328 attached thereto. Each of these sensors has a corresponding capacitance sensor mounted on the reference frame (see FIG. 10B). A first group of capacitance sensors is used to ensure that the mask assembly 252 is in the measurement position (pulled back), and a second group of capacitance sensors is used to ensure that the mask assembly 252 is in the calibration position (pushed forward). Furthermore, each of the mirrors has a corresponding Z interferometer. In the illustrated embodiment, the mask holder includes a mirror attached to an upper extension arm of the mask holder. The mirror is configured to receive a beam coming from the backside of the mask holder.

Figure 11A:
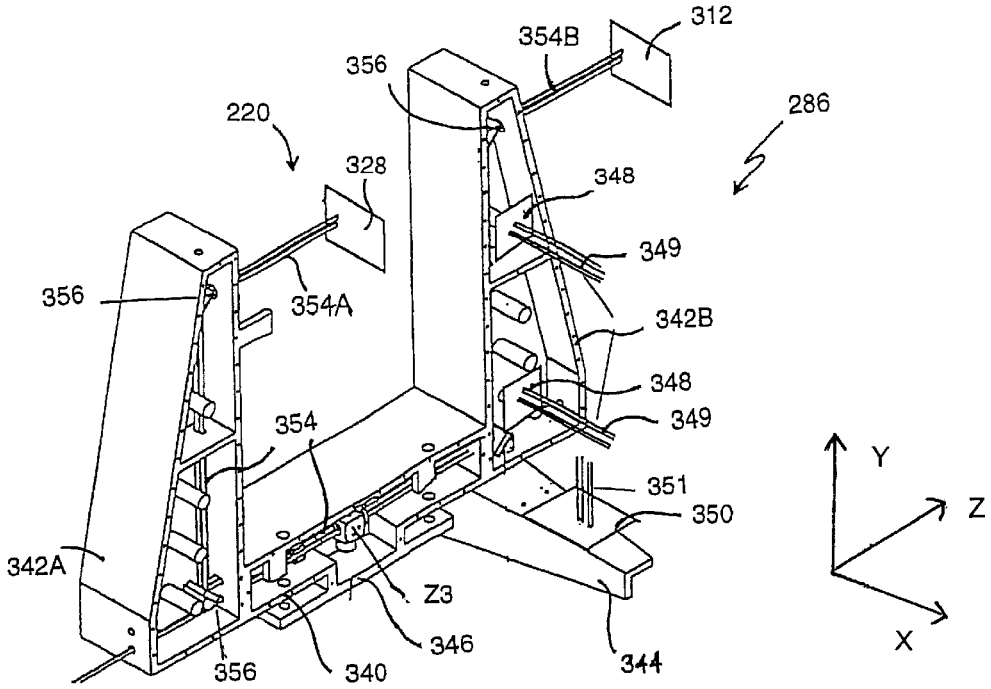
FIGS. 11A and 11B are perspective diagrams of a reference frame, in accordance with one embodiment of the present invention.
Figure 11B:
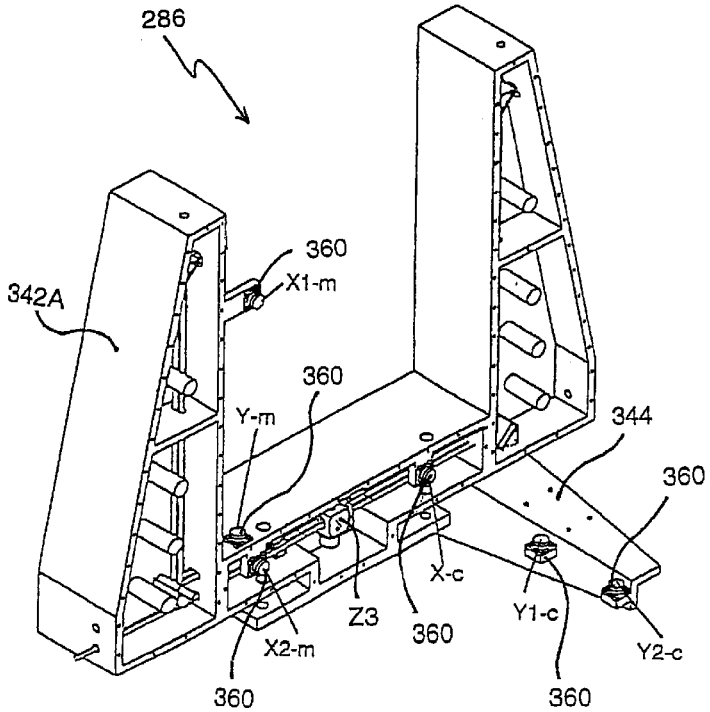

Referring to FIGS. 11A and 11B, the reference frame 286 will be described in greater detail. The reference frame 286 is the main measurement reference structure in the inspection system 200. The reference frame 286 may be formed from any suitable material that provides static, dynamic and temperature stability. By way of example, the reference frame 286 may be formed from invar. The reference frame is U-shaped, so as to include a base section 340 and two arms 342A and B extending therefrom. As shown, the arms 342 extend upward in the Y direction. The two arms 342A and B are spaced apart so as to define an open end 220 for allowing the projection unit 205 to be placed therebetween. The reference frame 286 also includes a third arm 344 extending in the X direction. The third arm 344 is positioned below the detector assembly (not shown). The reference frame 286 also includes a mounting foot 346 for attachment to the base 208. In one implementation, the mounting foot 346 is arranged isolate the reference frame 286 from distortions of the base 208.

The reference frame 286 provides the reference position for the interferometric position measurements of the detector assembly 256 and the capacitance measurements of the mask assembly 252. The X position and the Yaw $\theta_y$ position of the detector box 274 are referenced to the reference frame 286 with two mirrors 348 located on the second arm 342B of the reference frame 286. The two mirrors 348 are spaced apart in the Y direction so as to engage laser inputs 349 from the X interferometers (X1 and X2) located on the detector box 274. The Y position of the detector box 274 is referenced to the reference frame 286 via a mirror 350 located on the third arm 344 of the reference frame 286. The mirror 350 is positioned under the detector assembly 256 so as to engage a laser input 351 from the Y interferometer (Y) located on the detector box 274.

In one embodiment, one of the three interferometers (Z3) used for measuring in the Z direction includes a path through the reference frame 286 to go around the projection unit under test 205 thereby allowing an upper Z measurement, i.e., the projection unit would otherwise block a direct path. The upper Z measurement is generally needed to measure rotation about the X axis ($\theta_x$). As shown, a beam 354 is directed through the first and second arms 342 as well as the base section 340 of the reference frame 286. This is generally accomplished using the Z3 interferometer and a plurality of bending mirrors 356 rigidly attached to and located within the reference frame 286. In particular, the Z3 interferometer is disposed inside the base section 340 and the bending mirrors 356 are disposed inside the first and second arms 342. In the illustrated embodiment, four bending mirrors 356 pass the beams 354 around the projection optics 205. With regards to the interferomic position of the mask holder 262, a first beam 354A is directed out of the top of the first arm 342A so as to engage the mirror 328 on the mask holder 262. With regards to the interferomic position of the detector box 274, a second beam 354B is directed out of the top of the second arm 342B so as to engage the mirror 312 on the detector box 274. The other Z positions of are referenced to each other with the use of mirrors located on the mask holder 262 and the Z1 and Z2 on the detector box 274.

The reference frame 286 also includes a plurality of capacitance sensors 360 attached thereto. Each of these sensors 360 has a corresponding capacitance sensor mounted on the mask assembly (see FIG. 9). A first group of capacitance sensors 360 (designated with an m) is used to ensure that the mask assembly 252 is in the measurement position (pulled back), and a second group of capacitance sensors 360 (designated with a c) is used to ensure that the mask assembly 252 is in the calibration position (pushed forward).

Each of these groups of capacitance sensors are used to measure the X position, Y position and rotation about Z ($\theta_z$) of the mask assembly 252 relative to the reference frame 286. In the illustrated embodiment, the first group of sensors 360-m includes a pair of spaced apart X sensors and a single Y sensor. The X sensors measure the X position of the mask assembly 252 relative to the reference frame 286, as well as the rotation position (tilt) about the Z axis ($\theta_z$). The Y sensor measures the Y position of the mask assembly 252 relative to the reference frame 286. As shown, the X sensors are position in line in the Y direction with the first X sensor being positioned on the first arm 342A of the reference assembly 286, and the second X sensor being positioned on the base section 340 of the reference assembly 286. The Y sensor is positioned on the base section 340. In addition, the second group of sensors 360-c includes a pair of spaced apart Y sensors and a single X sensor. The Y sensors measure the Y position of the mask assembly 252 relative to the reference frame 286, as well as the rotation position (tilt) about the Z axis ($\theta_z$). The X sensor measures the X position of the mask assembly 252 relative to the reference frame 286. As shown, the Y sensors are positioned on the third arm 344 of the reference assembly 286 in line in the X direction, and the second X sensor is positioned on the base section 340 of the reference assembly 286. It should be noted that this arrangement of sensors is not a limitation and may vary according to the specific needs of each system.

Figure 12:
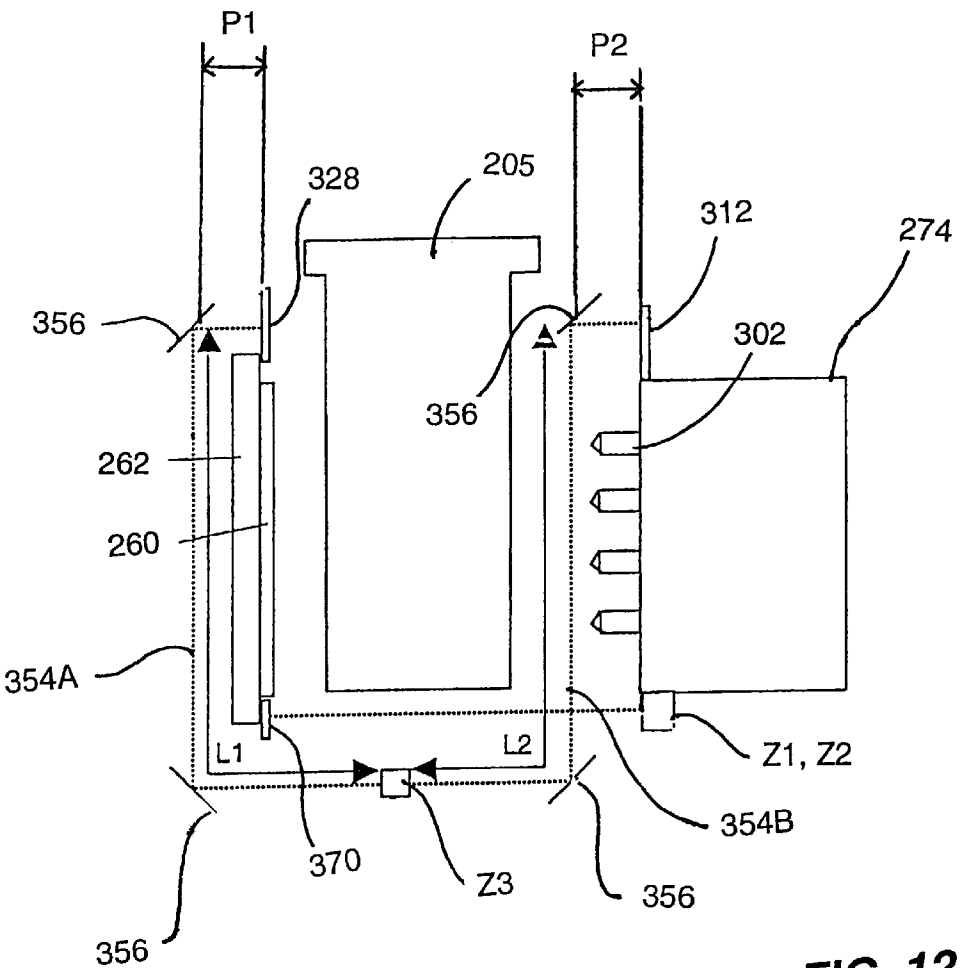
FIG. 12 is a simplified diagram of the reference frame of FIG. 11 showing the operation thereof, in accordance with one embodiment of the present invention.

Referring to FIG. 12, the operation of the Z axis interferometers will be described in greater detail. As shown, the projection unit under test 205 does not block the beams of the Z1 and Z2 interferometers and mirrors 370 that are mounted on the bottom of the detector box 274 and mask holder 262, respectively. The Z1 and Z2 interferometers allow measurement in the Z direction as well as measurement of rotation about the Y axis ($\theta_y$). As shown, the beams of Z1 and Z2 follow a direct path between the interferometers and corresponding mirrors.

The projection unit under test 205 also does not block the beams of the Z3 because of their path through the reference frame. The Z3 interferometer allows measurement in the Z direction as well as measurement of rotation about the X axis ($\theta_x$). As shown, the beams of Z3 follow an indirect path through the reference frame. In particular, the reference and measurement beams of the Z3 interferometer are sent up separate arms of the reference frame. The reference beam 354A is sent up though the first arm and the measurement beam 354B is sent up through the second arm. The distance the beams travel from the interferometer and through the arms is generally designated L1 and L2. In order to ensure measurement accuracy, the paths L1 and L2 should be kept proportional in length, as for example, through temperature change and any outside forces. In one implementation, the arms of the frame are configured to expand the same. For example, the frame may be made symmetrical to encourage uniform expansion.

Furthermore, the reference beam 354A is directed out of the first arm and onto the mirror 328 mounted on the mask holder and the measurement beam is directed out of the second arm and onto the mirror 312 mounted on the detector box. This is generally accomplished via the top bending mirrors 356. There are two short paths P1 and P2 provided by the two beams between the top bending mirrors and the mirrors mounted on the mask holder and the detector box. The interferometer measures the difference between P1 and P2. As should be appreciated, a differential change in these paths P1, P2 indicates a change in distance between the mask and the detectors. There is no measured difference if both paths change the same.

Figure 13A:
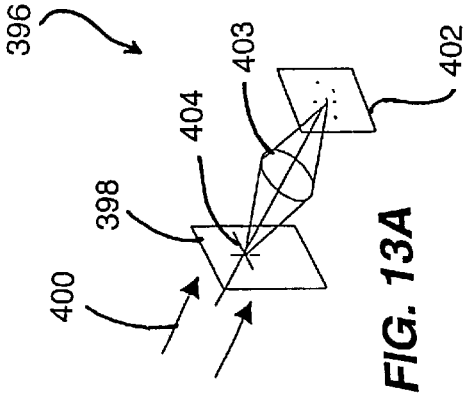
FIG. 13A is a simplified diagram of an individual imaging system in a first mode, in accordance with one embodiment of the present invention.
Figure 13B:
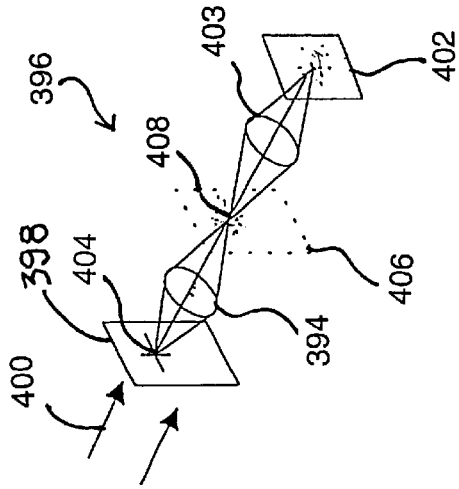
FIG. 13B is a simplified diagram of an individual imaging system in a second mode, in accordance with one embodiment of the present invention.

FIGS. 13A and 13B are simplified diagrams of an individual imaging system 396 in the calibration and measurement modes, respectively, in accordance with one embodiment of the present invention. By way of example, the individual imaging system may be one of the imaging systems used in the detector units of FIG. 9. As shown in FIG. 13A, the projection unit is removed and a test mask 398 is moved to the plane that coincides with the aerial image of the projected image of the projection optics. During imaging, the illumination 400 comes from behind the mask 398 and the test pattern is imaged on a CCD array 402 through an objective lens 403. The CCD array thus captures the image of the test pattern, and more particularly an alignment mark 404 (e.g., cross) within its field of view. Standard image processing finds the position of the alignment mark 404 within the field of view. In practice an array of alignment marks is located on the test mask 398 and the relative position of each is sequentially measured. Also during imaging, an interferometer system measures the position of the CCD array 402. The actual position of the alignment mark is thereby determined via standard image processing and the interferometer measurements.

As shown in FIG. 13B, the projection unit 394 is inserted and the projection unit projects an image of the test mask in the aerial image plane. During imaging, the illumination 400 comes from behind the mask 398 and the projected image of the test pattern is imaged on the CCD array. The CCD array thus captures the projected image of the test pattern, and more particularly a projected image of an alignment mark 408 (e.g., cross) within its field of view. Standard image processing finds the position of the projected image of the alignment mark within the field of view. In practice an array of alignment marks is located on the test mask and thus an array of projected images is created. The relative position of each is sequentially measured. Also during imaging, the interferometer system measures the position of the CCD array. The actual position of the projected image of the alignment mark is thereby determined via standard image processing and the interferometer measurements.

The measured positions of the alignment marks 408 can then be compared with the calibrated positions of the alignment marks 404 to determine distortions of the optical subsystem under test. As should be appreciated, distortion in the optical components (e.g., lens) of the optical subsystems may displace the projected image of the alignment mark and thus the projected image may be displaced on the surface of the CCD array 402 relative to the location of the alignment mark on the surface of the CCD array.

Figure 14A:
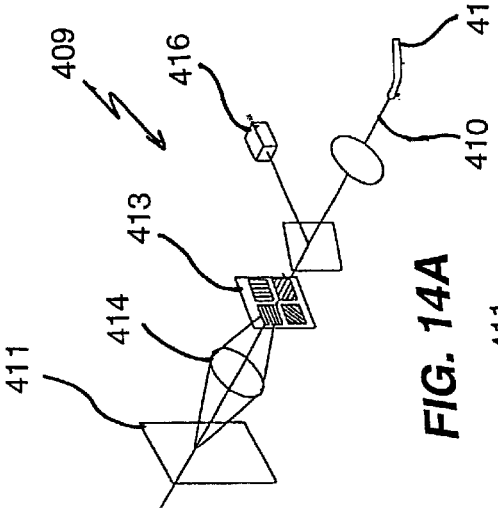
FIG. 14A is a simplified diagram of an individual confocal system in a first mode, in accordance with one embodiment of the present invention.
Figure 14B:
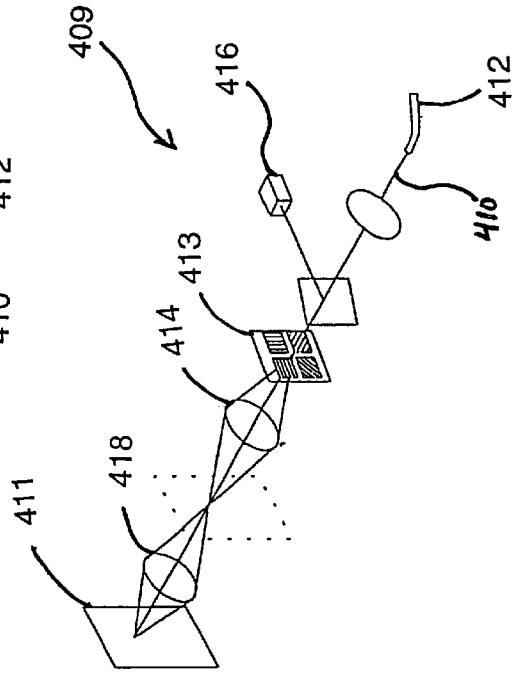
FIG. 14B is a simplified diagram of an individual confocal system in a second mode, in accordance with one embodiment of the present invention.

FIGS. 14A and 14B are simplified diagrams of an individual confocal system 409 in the calibration and measurement modes, respectively, in accordance with one embodiment of the present invention. By way of example, the individual confocal system may be one of the confocal systems used in the detector units of FIG. 9. As shown in FIG. 14A, the projection unit is removed and a test mask 411 is moved to the plane that coincides with the aerial image of the projected image of the projection optics. During confocal measurements, illumination 410 comes from a light source 412 inside the confocal system. The light illuminates an analyzing reticle 413. The analyzing reticle 413 can be opaque chrome with clear slits. The analyzing reticle 413 has slits in four orientations. Light from each slit is focussed by an objective lens 414 onto the test mask 411, and more particularly a focus mark that provides a reflective surface. If the reflective surface is at the focus point (in focus), all light will be reflected back through the same slit and will be fully detected on a quad detector 416. If the reflective surface is not at the focus point (out of focus), not all the light will return through the slits and the detected signal will decrease. Thus, the detected signal will peak at best focus as the detector unit is moved along the focus axis (Z). All focus marks on the test mask 411 that correspond to a useful field are measured in sequence. In this way, the detector system and the mask are calibrated.

As shown in FIG. 14B, the projection unit 418 is inserted and the projection unit projects an image of the test mask 411 at the aerial image plane. During confocal measurements, illumination 410 comes from the light source 412 inside the confocal system. The light 412 illuminates the analyzing reticle 413. Light from each slit is focussed by the objective lens 414 onto the test mask, and more particularly a focus mark that provides a reflective surface. If the reflective surface is at the focus point (in focus), all light will be reflected back through the same slit and will be fully detected on a quad detector 416. If the reflective surface is not at the focus point (out of focus), not all the light will return through the slits and the detected signal will decrease. Thus, the detected signal will peak at best focus as the detector is moved along the focus axis (Z). All focus marks on the test mask that correspond to a useful field are measured in sequence. In this way, the detector system and the mask are calibrated.

Imperfections in the lens will cause the focus to vary at different parts of the field. Moreover astigmatism will cause the four orientations of slits to focus at different points along the focus axis. A comparison of the calibration and measurement data then shows the focal plane and the astigmatism of the lens under test.

Figure 15:
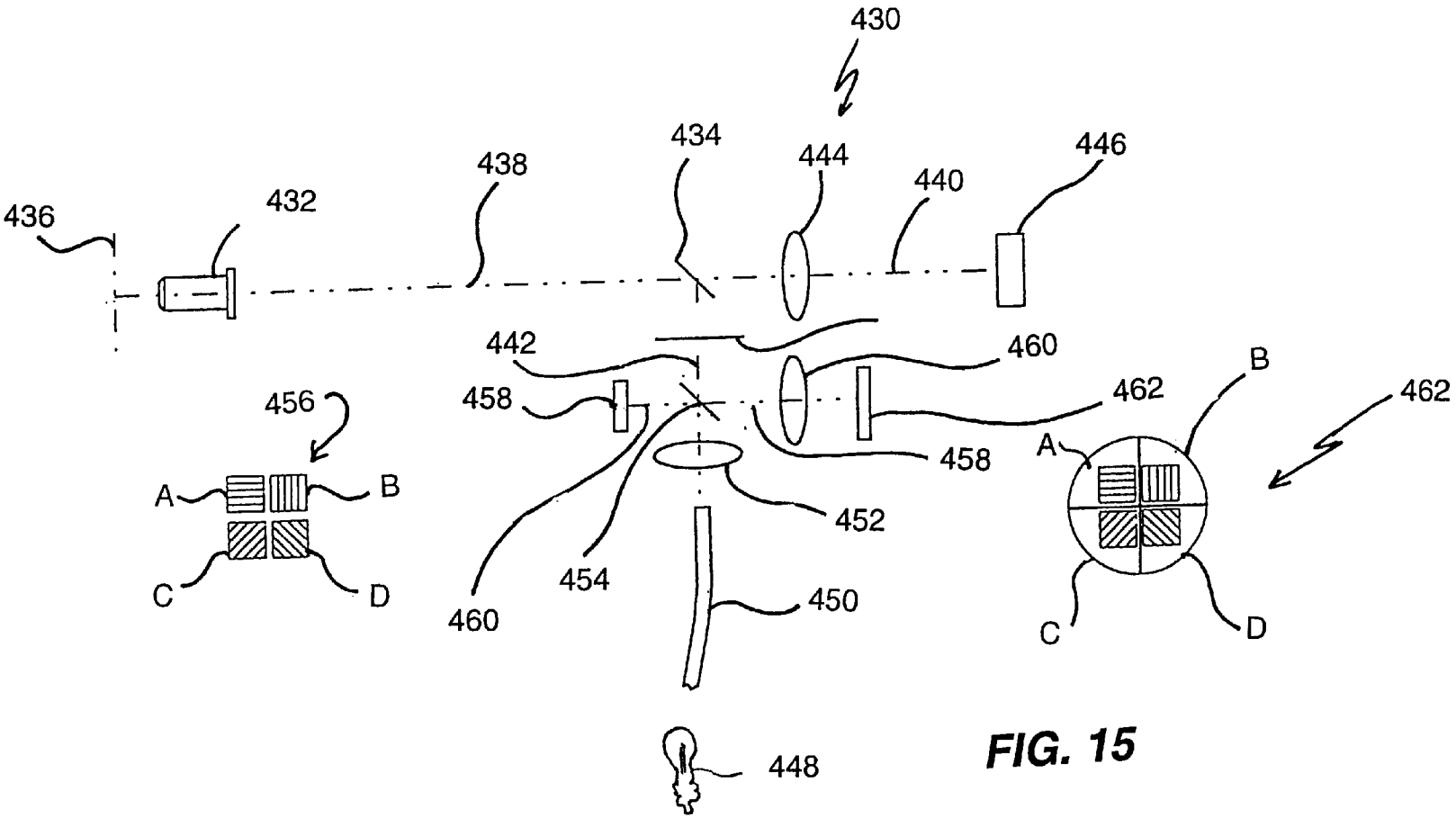
FIG. 15 is a simplified diagram of a detector unit that includes an imaging system and confocal system, in accordance with one embodiment of the present invention.

The imaging and confocal systems may be separate systems or they may be combined. FIG. 15 illustrates a detector unit that includes an imaging system and confocal system that are combined, in accordance with one embodiment of the present invention. In this embodiment, the imaging and confocal systems share a microscope objective 432 and a beam splitter cube 434. The microscope objective 432 is generally focussed on the aerial image plane. The beam splitter cube 434 is arranged to provide shared optical path 438 that is split from an imaging path 440 and a confocal path 442, i.e., the beam splitter separates the beams used by the imaging and confocal systems.

With regards to the imaging system, an illumination unit directs a light field through a test pattern of the test mask. The detector moves to an alignment mark contained within the test pattern and the microscope objective 436 picks up the image of the alignment mark (and if needed magnifies it). The image of the alignment mark is then directed along the optical path 438 until it reaches the splitter 434. The splitter 434 then directs a portion of the light to form an image along imaging path 440. The light continues along the imaging path 440 until it is received by a relay lens 444, which forms an image onto a CCD camera 446. In most cases, the microscope objective 432 and relay lens 444 are balanced to match the resolution of the aerial image to the resolution of the CCD camera 446. In one embodiment, the microscope objective 432 magnifies the image about 10× and the relay lens 444 magnifies the image about 6×. As such, the aerial image is magnified by 60× onto the CCD camera 446. This magnification matches the resolution of the aerial image to the resolution of the CCD camera 446. It also results in a reduced field size. This generally requires that the detector unit 430 be translated in the x and y directions to measure all parts of the projection unit optical field. The image captured by the CCD camera 446 is processed to find the position of the alignment target on the CCD camera 446. This data is combined with the interferometer data associated with the detector unit position to produce a resultant set of data associated with the position of the alignment target. If both measurements have been performed, the resultant data of the projection unit may then be compared with the resultant data of the test mask. This comparison removes the need to know offsets and origins. Unlike the imaging system, the confocal system includes its own illuminator 448. By way of example, the illuminator 448 may be a mercury lamp. In one embodiment, a single mercury lamp is used, and each detector 430 includes a fiber conduit 450 that transfers light therefrom. The light emitted from the fiber conduit 450 is collected by a lens 452 and focused onto the pupil of the microscope objective 432. In so doing, the light beam travels along the confocal path 442 and the optical path 438. While on the confocal path 442, the light beam intersects a splitter 454 that distributes a first light portion to an analyzing reticle 456 along the confocal path 442 and a second light portion to a reference detector 458. The reference detector 458 is arranged to measure the intensity of the light for signal normalization. In most cases, a small percentage of the light is distributed to the reference detector 458 along path 460. Reference detectors are generally well known in the art and for the sake of brevity will not be discussed in detail.

The light that continues on the confocal path 442 illuminates the analyzing reticle 456. In one embodiment, the analyzing reticle 456 includes a plurality of slits for allowing the light to pass therethrough. By way of example, the slits may have a width of about 30um and a period of about 120 um. In one embodiment, the analyzing reticle 456 includes four orientations A–D for measuring astigmatism (e.g., horizontal, vertical, 45 degrees). After passing through the analyzing reticle 456 the light intersects the splitter 434 where it is transferred to the optical path 438. The light continues along the optical path 438 until it is received by the microscope objective 432, which directs the light onto the aerial image plane 436. In one embodiment, the light is demagnified by 10× onto the aerial image plane and thus the slits are only 3 um wide at the aerial image plane. This width is about the same as the resolution of the optics under test. It should be noted that this is not a limitation and that the demagnification may be modified to coincide with the resolution of the optics under test (if something other than 3 um).

When using the confocal system, the detector 430 moves to a focus mark contained within the test pattern. Because the focus target is reflective, the image of the reticle is reflected back through the microscope objective 432 and along the optical path 438 until it reaches the splitter 434. In the measurement mode, the light makes a double pass through the optics under test. The splitter 434 then directs the image along the confocal path 442 where it intersects the analyzing reticle 456. If in focus, most of the light passes back through the slits in the analyzing reticle 456. If out of focus, a smaller portion of the light passes through slits of the analyzing reticle 456. After passing through the analyzing reticle 456, the light then continues along the confocal path 442 until it reaches the splitter 454. The splitter 454 distributes the light along a detector path 458 where it intersects a lens 460 that re-images the analyzing reticle 456 onto a quadrant detector 462. The image position is adjusted so that each type of slit (e.g., orientation) is detected by only one segment of the quad detector 462. Thus, the quadrant detector 462 is used as four separate detectors mounted conveniently close together.

As the detector is moved in the focus axis, the confocal signal on each quadrant varies. The peak signals generally occur at best focus. Because of astigmatism, the best focus may be at different positions for each quadrant. When the aerial image plane is filled by the optics under test, the focus peaks may be shifted by imperfections of the projection unit optics. Again, the desired result is obtained by comparing the data by subtraction. The offsets and origins are therefore eliminated mathematically.

It should be noted that beam splitter 434 may be designed to reflect about 90% of the incident light while transmitting 10% of the incident light. This ratio is typically selected to optimize the confocal signal. The confocal signal (amount of light) is preferably raised since light reflects from the splitter 434 twice, and therefore having a higher reflectivity splitter improves the signal. The imaging light turns out to be relatively plentiful and the 90% loss of light by passing once through the beam splitter is not a detriment to quality performance.

Figure 16:
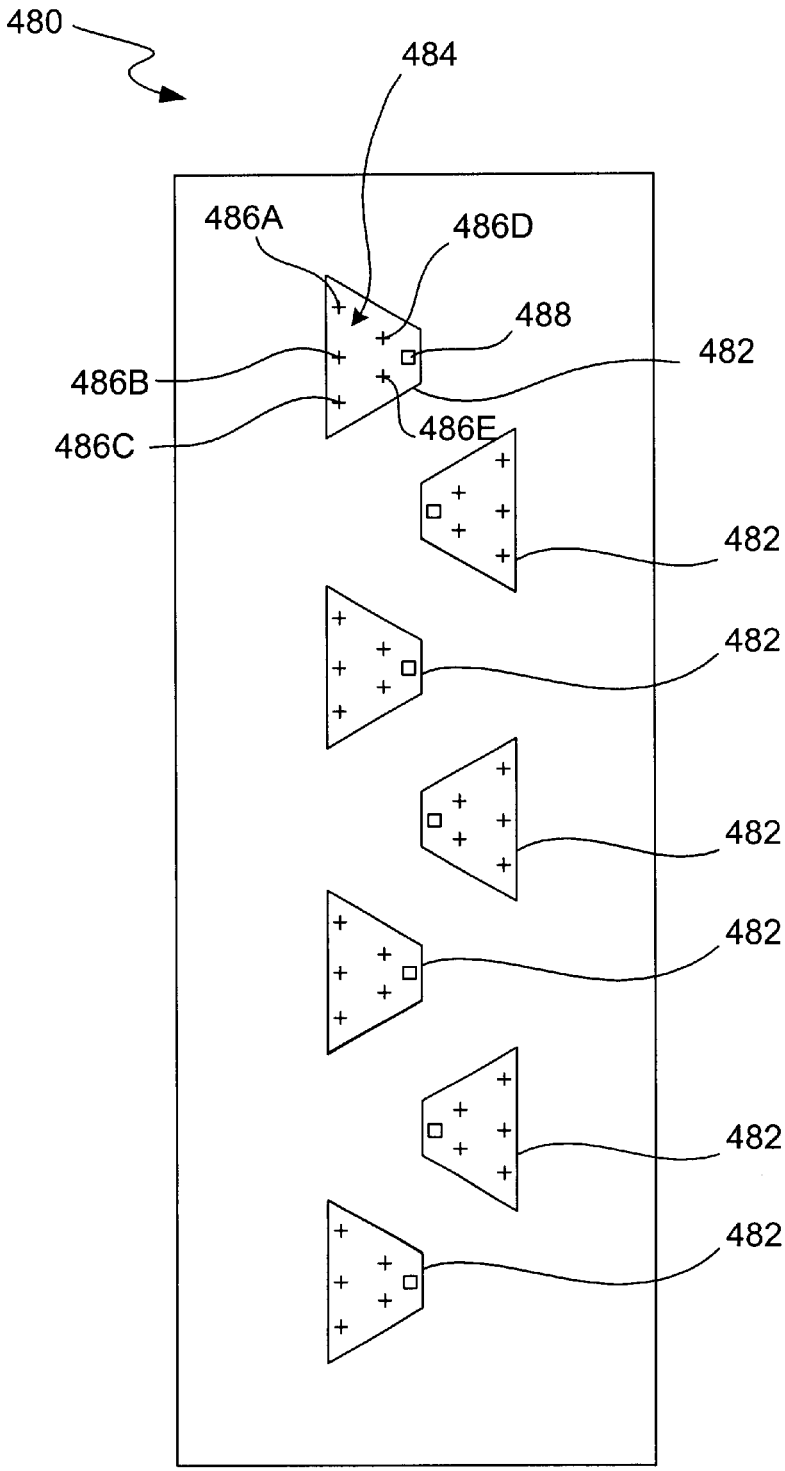
FIG. 16 is a simplified diagram of a test mask, in accordance with one embodiment of the present invention.

FIG. 16 is a simplified diagram of a test mask 480, in accordance with one embodiment of the present invention. The test mask 480 includes a plurality of test patterns 482. The number of test patterns 482 generally corresponds to the number of subsystems to be tested. In the illustrated embodiment, there are seven test patterns 482. Each of the test patterns 482 includes a plurality of inspection targets 484. The inspection targets 484 are used to determine displacement in the X, Y and Z directions. The inspection targets 484 may include alignment marks 486 for determining shifts in the X and Y directions and/or focus marks 488 for determining offset in the Z direction. The alignment marks 486 may be formed as a cross in the X and Y directions and the focus mark 488 may be formed from a planar reflective surface in the X and Y directions. During imaging, each of the detectors provides a field of view in which the alignment marks 486 are imaged. The alignment marks 486 may or may not be centered in the field of view. Standard image processing as is well known in the art can determine the position of the alignment marks 486 within the field of view. In one embodiment, individual detectors simultaneously image an alignment mark 486 in an individual test pattern 482. For example, as shown, a first detector may image an alignment mark in a first test pattern, a second detector may image an alignment mark in a second test pattern, and the like. Furthermore, the individual detectors may follow a specific sequence so as to measure the plurality of alignment marks contained within an individual test pattern. For example, as shown, each detector may move to a first alignment mark 486A, a second alignment mark 486B and so on through 486E.

While this invention has been described in terms of several preferred embodiments, there are alterations, permutations, and equivalents, which fall within the scope of this invention. For example, although the mask holder is shown and described as moving via a stage, it should be noted that in some cases the mask holder may be fixed or stationary, i.e., without a stage. In cases such as these, the detector assembly may be configured to move between the measurement position and the calibration position. Furthermore, the interferometry system may include large mirrors for helping detect the position of the detector assembly when moved to these two positions, i.e., the mirrors may be continuous such that they span the measurement position and the calibration position.

In one particular implementation, the interferometry system may include a y interferometer, a pair of x interferometers, and three z interferometers. The y interferometer is attached to the detector assembly and is configured to interact with a continuous and calibrated fixed mirror to measure detector positions in the y direction. The x interferometers are also attached to the detector assembly and are configured to interact with a continuous and calibrated fixed mirror. Both the x and y mirrors are configured to span the z direction. The z interferometers are attached to a fixed portion of the inspection system and are configured to interact with small mirrors located on the detector assembly. As should be appreciated, the x interferometers detect x and yaw positions of the detector assembly, the y interferometer detects y positions of the detector assembly, the z interferometers detect z, roll and pitch positions of the detector assembly.

It should also be noted that the detector assembly may be varied. For example, each of the detectors of the detector assembly may include a different arrangement of elements. In one particular implementation, each detector of the detector assembly may include an objective, an analyzing reticle, a lens and a quadrant detector. The objective is used to re-image the test mask image onto the analyzing reticle. That is, each objective focuses an enlarged image of the aerial image (typically 10×) onto the analyzing reticles. Each of the analyzing reticles has a slit or cross shaped opening. The reticles can be opaque chrome with a cross of clear slits. The lens is used to re-image the pupil onto the quadrant detector. The entire detector (in unison with the other detectors) is scanned in the x and y direction and the quadrants are summed in pairs to find the focus in the x and y directions. That is, when scanned in x and y, the detectors record that part of the aerial image that passes through the slits. The complete scan signal indicates the profile of the aerial image.

It should also be noted that there are many alternative ways of implementing the methods and apparatuses of the present invention. For example, the multiple detectors of the detector assembly may cooperate to measure one large field rather than their own individual field. That is, each detector measures a particular region of the field rather than the entire field. In addition, a wafer exposure function may be added to provide an independent means of checking the aerial image measurement.

It is therefore intended that the following appended claims be interpreted as including all such alterations, permutations, and equivalents as fall within the true spirit and scope of the present invention.

What is claimed is:

1. An inspection system for performing optical tests associated with determining the imaging quality of a plurality of optical subsystems of an optical system, the optical tests being performed with a test mask having a plurality of measurable test patterns formed thereon, the inspection system comprising:

a detector assembly capable of measuring the measurable test patterns of the test mask and the aerial image of the measurable test patterns as projected through the optical subsystems so as to determine the optical characteristics of each of the optical subsystems.

2. The system as recited in claim 1 wherein the measured data associated with test patterns of the test mask is compared to the measured data associated with the image of the test patterns as projected through the optical subsystems to determine the optical characteristics of the optical subsystems.

3. The system as recited in claim 2 wherein the measured data associated with test patterns of the test mask is calibrated out of the measured data associated with the image of the test patterns as projected through the optical subsystems to produce a resultant set of data that more closely matches the actual optical characteristics of the optical subsystems.

4. The system as recited in claim 1 wherein the optical characteristics correspond to focus or distortion characteristics.

5. The system as recited in claim 1 wherein the detector assembly includes a plurality of detector mechanisms for measuring the test patterns of the test mask and the images of the test patterns as projected through the optical subsystems.

6. The system as recited in claim 5 wherein the number of detector mechanisms corresponds to the number of optical subsystems.

7. The system as recited in claim 5 wherein the detector mechanisms are configured to simultaneously measure the optical characteristics of each of the optical subsystems.

8. The system as recited in claim 5 wherein the detector mechanisms each have an imaging element configured to measure distortion characteristics and a confocal element configured to measure focus characteristics.

9. The system as recited in claim 1 wherein the detector assembly is capable of moving during inspection so as to measure an array of test marks contained within each of the test patterns.

10. The system as recited in claim 9 wherein the detector assembly includes a plurality of detector mechanisms that are ganged together so as to gather data at the same time during movements by the detector assembly.

11. The system as recited in claim 9 further including a position location assembly configured to monitor the position of the detector assembly during movements thereof.

12. The system as recited in claim 9 wherein the position location assembly includes a 6 axis interferometer system that continuously monitors the position of the detector assembly.

13. The system as recited in claim 1 further including a mask assembly configured to hold the test mask during measurements and to move the test mask between a calibration position where the test patterns of the test mask are measured and a measurement position where the image of the test patterns are measured.

14. The system as recited in claim 13 wherein the mask assembly comprises:

a mask holder configured to hold the test mask; and a mask stage configured to move the holder and thus the test mask when held thereon between the measurement and calibration positions.

15. The system as recited in claim 13 further including a position location assembly configured to monitor the position of the mask assembly.

16. The system as recited in claim 1 further including an illumination assembly configured to illuminate the test mask during measurement thereof.

17. The system as recited in claim 16 wherein illumination assembly comprises:

an illumination unit for generating and directing one or more beams through the test mask, the number of beams corresponds to the number of optical subsystems; and an illumination stage for moving the illumination unit prior to measurements by the detector assembly.

18. The system as recited in claim 1 wherein the detector assembly is capable of moving during measurements, and further including a mask assembly for moving the test mask to various test positions and a position location assembly for determining the position of the mask assembly and the position of the detector assembly relative to one or more reference points.

19. The system as recited in claim 18 wherein the reference point is defined by the assemblies themselves, some fixed portion of the system or some component external to the system.

20. The system as recited in claim 18 wherein the position location assembly includes a fixed reference frame configured to provide a reference point relative to the mask assembly and the detector assembly.

21. The system as recited in claim 18 wherein the position locator assembly includes one or more first sensors for determining the position of the mask assembly and one or more second sensors for determining the position of the detector assembly.

22. The system as recited in claim 19 wherein the first sensors are capacitance sensors and the second sensors are interferometer sensors.

23. The system as recited in claim 1 wherein the optical system is a projection unit used in a lithography system, each of the subsystems being configured to collect and direct a corresponding light beam to the surface of a substrate.

24. The system as recited in claim 1 further including a structural chassis and a support arrangement, the structural chassis being configured to support the support arrangement and the detector assembly, the support arrangement being configured to locate the projection unit relative to the detector system and an adjustment window, the adjustment window allowing adjustments to be made to the projection unit without removing the projection unit from the inspection system.

25. A detector assembly for use in a tool for inspecting optical systems having a plurality of optical subsystems, the detector assembly comprising:

a plurality of detector mechanisms, each of the detector mechanisms corresponding to individual ones of the optical subsystems, the detector mechanisms being configured to simultaneously measure the optical characteristics of each of the optical subsystems.

26. The detector assembly as recited in claim 25 further including a detector box attached to a detector stage, the detector box containing the plurality of detector mechanisms, the detector stage being configured to move the detector box so as to move the detector mechanisms in positions for measuring the optical characteristics of the optical subsystems.

27. The detector assembly as recited in claim 25 wherein each of the detector mechanisms includes an objective lens and an optical testing system that is coupled to the objective lens.

28. The detector assembly as recited in claim 27 wherein the optical testing system includes a confocal subsystem configured to measure the optical characteristics associated with focus.

29. The detector assembly as recited in claim 27 wherein the optical testing system includes an imaging subsystem configured to measure optical characteristics associated with distortion or aberrations.

30. The detector assembly as recited in claim 27 wherein the optical testing system includes a confocal subsystem and an imaging subsystem.

31. A position location assembly for use in a tool for inspecting optical systems having a plurality of optical subsystems, the assembly comprising:

a detection system configured to continuously determine the position of a detector assembly relative to one or more reference points, the detection system including one or more first sensors that measure the distance between a fixed reference frame and the detector assembly, and one or more second sensors that measure the distance between a test mask and the detector assembly.

32. The position location assembly as recited in claim 31 wherein the detection system is a 6 axis interferometer system configured to provide positional information in the x, y and z directions as well as the rotational $\theta_x$, $\theta_y$, $\theta_z$ directions.

33. The position location assembly as recited in claim 32 wherein the one or more first sensors include a pair of x-axis interferometers and a y-axis interferometer, and wherein the one or more a second sensors include three z-axis interferometers, the pair of x-axis interferometers providing positional information in the x and $\theta_z$ directions, the y-axis interferometer providing positional information in the y direction, the z-axis interferometer providing positional information in the z, $\theta_x$ and $\theta_y$ directions.

34. The position location assembly as recited in claim 33 wherein the pair of x-axis interferometers are spaced apart along a similar axis and positioned on the detector assembly across from the reference frame, the y-axis interferometer are positioned on the detector assembly across from the reference frame, the x-axis and y-axis interferometers interacting with a corresponding mirror positioned on the reference frame across from the corresponding interferometer.

35. The position location assembly as recited in claim 33 wherein a pair of z-axis interferometers are spaced apart along a similar axis and positioned on the detector assembly across from the test mask, the pair of z-axis interferometers interacting with a pair of corresponding mirrors positioned proximate the test mask across from the corresponding interferometers, and wherein the other z-axis interferometer is positioned on the reference frame, the other z-axis interferometer interacting with corresponding mirrors positioned proximate the test mask and on the detector assembly.

36. The position location assembly as recited in claim 31 further including a second detection system configured to determine the position of the test mask relative to one or more reference points, the detection system including one or more third sensors that measure the position of the test mask relative to the reference frame.

37. An inspection system, comprising:

a test component configured to help determine the optical characteristics of an optical component;

an optical detection component configured to perform optical tests on an optical component, the detector component cooperating with the test component to determine the optical characteristics of the optical component, the optical component being disposed between the test component and the detector component while the tests are being performed;

a position detection component configured to measure the distance between the test component and the detector component with an indirect path around the optical component which blocks the direct path.

38. The inspection system as recited in claim 37 wherein the position detection component includes an interferometer arrangement that produces a first beam that follows a first indirect path around the optical component to a first mirror and a second beam that follows a second indirect path around the optical component to a second mirror.

39. The inspection system as recited in claim 37 wherein a differential change in the length of the indirect paths indicates a change in distance between the test component and the detector component.

40. The inspection system as recited in claim 37 wherein the first and second indirect paths are proportional in length when the test component and the detector component are at first distance, and wherein the first and second indirect paths are not proportional in length when the test component and the detector component are at second distance.

41. The inspection system as recited in claim 37 wherein the position detection component includes one or more bending mirrors to direct the beams around the optical component.

42. The inspection system as recited in claim 37 wherein the first mirror is mounted on the test component, and wherein the second mirror is mounted on the detector component.

43. The inspection system as recited in claim 37 wherein the interferometer arrangement includes one or more interferometers for producing the first and second beams.

44. The inspection system as recited in claim 37 wherein the interferometer is disposed inside a frame, and wherein the first indirect path travels through a first portion of the frame and wherein the second indirect path travels through a second portion of the frame.

45. A method of self calibrating an inspection system, the inspection system being configured to inspect an optical component of a lithography system, the method comprising:

providing a test mask having on or more test patterns;

measuring the test patterns with the inspection system;

measuring the images of the test patterns with the same inspection system, the images being formed by the optical component; and comparing the test patterns with the images.

46. The method as recited in claim 45 wherein position measurements are performed so as to determine distortion characteristics of the optical components.

47. The method as recited in claim 45 wherein focus measurements are performed so as to determine focus characteristics of the optical components.

48. The method as recited in claim 45 wherein the optical characteristics of the optical component are determined during the comparison by calibrating out imperfections associated with the test mask and inspection system.

49. A method of inspecting optical projection units having multiple fields, the method comprising simulataneously measuring multiple fields with multiple detectors, each of the detectors corresponding to an individual field;

moving the multiple detectors to various measurement points within its corresponding individual field; and determining the position of each detector with 6 axis interferometry.

* * * * *